(12) United States Patent
Kim et al.

(10) Patent No.: US 12,479,690 B2
(45) Date of Patent: Nov. 25, 2025

(54) METHOD AND SYSTEM FOR CONTROLLING ELEVATOR FOR ROBOT PASSENGERS

(71) Applicant: NAVER LABS CORPORATION, Seongnam-si (KR)

(72) Inventors: Seoktae Kim, Seongnam-si (KR); Yesook Im, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 1435 days.

(21) Appl. No.: 17/077,585

(22) Filed: Oct. 22, 2020

(65) Prior Publication Data

US 2021/0122606 A1    Apr. 29, 2021

(30) Foreign Application Priority Data

Oct. 25, 2019 (KR) .................. 10-2019-0134022

(51) Int. Cl.
*B66B 1/14* (2006.01)
*B66B 1/34* (2006.01)
*B66B 3/00* (2006.01)

(52) U.S. Cl.
CPC .............. *B66B 1/14* (2013.01); *B66B 1/3423* (2013.01); *B66B 1/3446* (2013.01); *B66B 3/002* (2013.01); *B66B 2201/4661* (2013.01)

(58) Field of Classification Search
CPC ....... B66B 1/14; B66B 1/3423; B66B 1/3446; B66B 3/002; B66B 2201/4661
USPC ........................................................ 318/247
See application file for complete search history.

(56) References Cited

U.S. PATENT DOCUMENTS

2021/0046650 A1 * 2/2021 Deyle ................. G05D 1/0214

FOREIGN PATENT DOCUMENTS

| JP | 2005053671 A | 3/2005 |
| JP | 2009051617 A | 3/2009 |
| JP | 2014532609 A | 12/2014 |
| KR | 1020050024840 B1 | 10/2005 |
| KR | 1020170125302 A | 11/2017 |
| WO | 2018066054 A1 | 4/2018 |

OTHER PUBLICATIONS

Koba et al. (WO 2018066054 A1) Elevator Control Device and Autonomous Moving Body Control Device ( Year: 2018).*
Han et al. (CN 109164813 A)A Unmanned Express Robot And Elevator System And Control Method (Year: 2019).*
Aoyama (JP 2009051617 A)Elevator Control System (Year: 2011).*
Hirai (Jp 6350767 B1) Elevator Control Device And Autonomous Mobile Body Control Device (Year: 2018).*
Hirai et al. (JP 6350767 B1). Elevator Control Device And Autonomous Mobile Body Control Device (Year: 218).*

(Continued)

*Primary Examiner* — Jorge L Carrasquillo
(74) *Attorney, Agent, or Firm* — Greer Burns & Crain Ltd.

(57) ABSTRACT

A method of controlling an elevator includes detecting that a robot providing a service on a floor within a building has gotten on an elevator moving through floors within the building, and controlling the elevator to move to a floor where the robot is to provide the service. At least one of the internal user interface and the external user interface of the elevator is configured to indicate whether the robot is using the elevator.

18 Claims, 14 Drawing Sheets

(56) References Cited

OTHER PUBLICATIONS

Office Action issued in corresponding Korean patent application No. 10-2019-0134022, dated Feb. 17, 2021.
Japanese Office Action issued in corresponding Japanese patent application No. 2020-178417, dated Aug. 31, 2021.

* cited by examiner

<Robot control system>

METHOD AND SYSTEM FOR CONTROLLING ELEVATOR FOR ROBOT PASSENGERS

CROSS-REFERENCE TO RELATED APPLICATION

This application claims priority under 35 U.S.C. § 119 to Korean Patent Application No. 10-2019-0134022 filed on Oct. 25, 2019, which is incorporated herein by reference in its entirety.

BACKGROUND OF THE INVENTION

Technical Field

The following description relates to a method and a system for controlling an elevator and, more particularly, to a method and a system for controlling an elevator on which a robot passenger providing a service will get on, while moving through floors within a building.

Description of the Related Art

An autonomous driving robot is a robot that autonomously finds an optimum path to a destination using wheels or legs, while looking around surroundings and detecting an obstacle, and is developed and used for various fields, such as an autonomous driving vehicle, logistics, hotel services, and robot cleaners.

A robot used to provide a service within a building may have to get on an elevator installed in the building in order to provide a service in a specific floor of the building. However, if an elevator is simply summoned and used by the robot or a robot control system controlling the robot, a case where a congested elevator is summoned or the robot cannot get on the elevator frequently occurs. This makes it difficult for the robot to efficiently provide a service.

Accordingly, there is a need for a method and system for controlling an elevator on which a robot will get on, which can make more efficient the provision of a service by the robot.

Korean Patent Application Publication No. 10-2005-0024840 is a technology related to a path planning method for an autonomous mobile robot, and discloses a method of planning an optimum path, wherein a mobile robot autonomously moving at home or in an office can move to a target point safely and rapidly while avoiding an obstacle.

BRIEF SUMMARY OF THE INVENTION

Embodiments of the present invention may provide an elevator control method capable of detecting a robot getting on an elevator, controlling the elevator to move to a floor where the robot will provide a service, and configuring at least one of the internal user interface and external user interface of the elevator to indicate whether the robot uses the elevator.

Embodiments may provide an elevator control method capable of setting a specific elevator as a dedicated elevator on which a robot will get on for a given time period so that the elevator can be used by the robot.

Embodiments may provide an elevator control method capable of summing a proper elevator for a robot by considering a waiting space for an elevator and a degree of congestion within the elevator.

In an aspect, there is provided a method of controlling an elevator for robot passengers, wherein the method is performed by a system for controlling an elevator for a robot passenger, and includes detecting that at least one robot providing a service on at least one of floors within a building gets on an elevator moving through the floors, and controlling the elevator to move to a floor where the robot is to provide the service. At least one of an internal user interface and an external user interface of the elevator may be configured to indicate whether the robot is using the elevator.

A plurality of elevators may be provided in the building. The method may further include setting the elevator, among the plurality of elevators, as a dedicated elevator for the robot for a given time period.

At least one of the external user interface and the internal user interface of the elevator set as the dedicated elevator may be configured to indicate that the elevator has been set as the dedicated elevator for the robot.

The internal user interface may be configured to indicate a floor where the robot is to provide the service when the robot gets on the elevator.

The internal user interface may be configured to indicate information on a floor where another robot is to get on the elevator.

A plurality of robots may provide services within the building. Detecting that the at least one robot gets on the elevator may include detecting that each of the robots gets on the elevator. Controlling the elevator may include controlling the elevator to sequentially move to floors where the robots are to provide services, respectively.

The elevator may be controlled to not move to a floor where a user summons the elevator although there is a summons from the user who wants to use the elevator.

The external user interface may be configured to indicate that the robot is getting on the elevator or that the elevator is used as a dedicated elevator for the robot, but not to indicate whether the elevator goes up or down, a current location of the elevator, and a floor where the elevator is scheduled to stop.

The internal user interface may be configured to have an inter-floor move button deactivated so that a user who has gotten on the elevator is unable to set a floor to which the elevator is to move.

The internal user interface may be configured to have the door close button deactivated so that a user who has gotten on the elevator is unable to forcedly close the door of the elevator.

The method may further include receiving a summons from a robot control system controlling the robot, selecting an elevator to be summoned to a floor indicated by the summons, and controlling the selected elevator to move to the floor indicated by the summons.

The method may further include receiving a cancellation of the summons on the selected elevator from the robot control system when the robot is unable to get on the selected elevator, selecting another elevator to be summoned to the floor indicated by the summons, and controlling the other elevator to move to the floor indicated by the summons.

The method may further include receiving a summons from a robot control system controlling the robot, selecting an elevator to be summoned to a floor indicated by the summons, receiving a cancellation of the summons on the selected elevator from the robot control system when a given number or more of users or robots are present in a waiting space for getting on the selected elevator, selecting another elevator to be summoned to the floor indicated by the summons, and controlling the other elevator to move to the floor indicated by the summons.

The method may further include setting a state of the elevator as a full state when it is determined that a space sufficient for the robot to get on the elevator is not present. The state of the elevator set in the full state may be set as a summons-impossible state.

The internal user interface of the elevator may be configured to output an indicator indicative of the full state. The indicator may be output, until a user or robot gotten on the elevator gets off the elevator and the sufficient space is secured. The state of the elevator may be set as a summons-possible state when the sufficient space is secured.

A plurality of robots controlled by the robot control system may provide services within the building. Receiving the summons may include receiving, from the robot control system, summons associated with the plurality of robots. Selecting the elevator may include selecting an elevator to be summoned to a floor indicated by each of the summons. Controlling the selected elevator may include controlling the selected elevator so that a robot to get off the selected elevator later or last, among the plurality of robots, gets on the selected elevator first.

In another aspect, there is provided a system for controlling an elevator for robot passengers, including at least one processor implemented to execute a computer-readable instruction. The at least one processor controls the system to detect that at least one robot providing a service on at least one of floors within a building gets on an elevator moving through the floors, and to control the elevator to move to a floor where the robot is to provide the service. At least one of an internal user interface and an external user interface of the elevator is configured to indicate whether the robot is using the elevator.

In still another aspect, there is provided a robot control method performed by a robot control system controlling a robot which moves through floors of a building using an elevator and provides a service, including transmitting, to a system controlling an elevator, a summons including information on a floor where the robot is located and a floor where the robot is to provide a service; controlling the robot to get on an elevator moved to the floor where the robot is located, in response to the summons; controlling the robot to get off the elevator when the elevator automatically moves to the floor where the robot is to provide the service based on the information on the floor where the robot is to provide the service included in the summons and arrives at the floor where the robot is to provide the service; and controlling the robot to provide the service on the floor where the robot is to provide the service.

The robot control method may further include transmitting a cancellation of the summons to the system controlling the elevator and transmitting a summons for requesting another elevator, when a given number or more of users or robots are present in a waiting space for the elevator moved to the floor where the robot is located in response to the summons or when the robot is unable to get on the elevator moved to the floor where the robot is located.

DETAILED DESCRIPTION OF THE INVENTION

Hereinafter, embodiments are described in detail with reference to the accompanying drawings.

Figure 1:
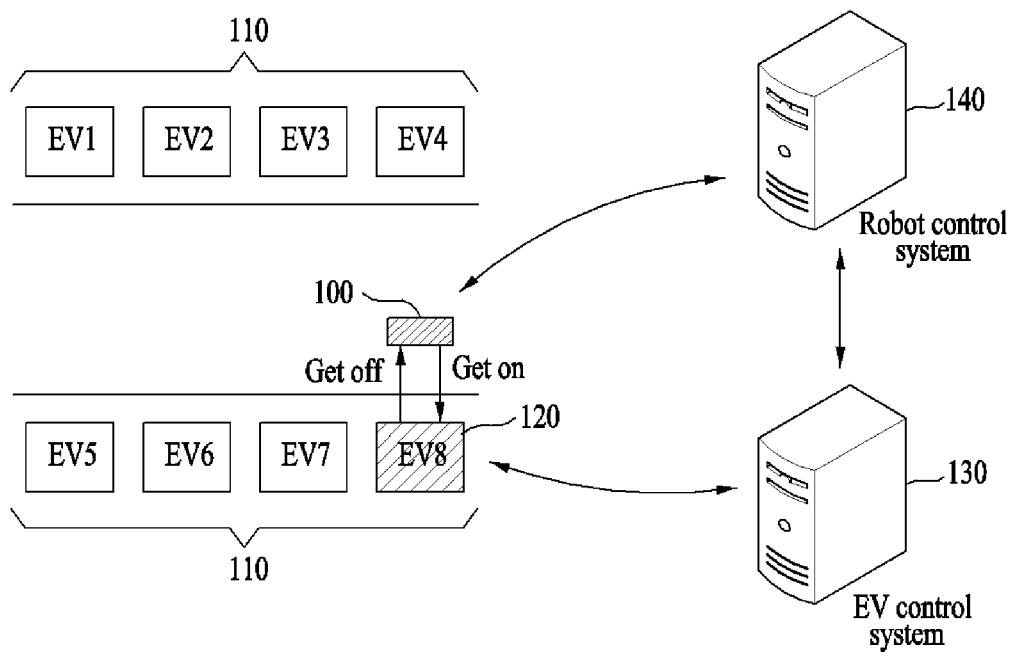
FIG. 1 illustrates an elevator control method for robot passengers according to an embodiment.

FIG. 1 illustrates an elevator control method for a robot passenger according to an embodiment.

FIG. 1 illustrates elevators EV1 to EV8 110 installed within a building. The elevators EV1 to EV8 110 are apparatuses moving through floors within the building, and may move through floors within a building for a user (i.e., a person) or a robot 100 with the user, or the robot 100 by itself. Each of the elevators 110 may be configured to be available to a common user and the robot 100.

A summons on and a movement of each of the elevators 110 may be controlled by an elevator (EV) control system 130. For example, the EV control system 130 may select a proper elevator based on a summons from a user or the robot 100 (or a robot control system 140 controlling the robot 100), and may move the selected elevator to a summoned location. The configuration of the EV control system 130 is described more specifically with reference to FIG. 3.

In the illustrated example, the elevator EV8 120 may be an elevator summoned in response to a summons from the robot 100 (or the robot control system 140 controlling the robot). Alternatively, the elevator 120 may have been set as a dedicated elevator for the robot 100.

The robot 100 may be a service robot used to provide a service within the building. The robot 100 may be configured to provide a service in at least one floor. Furthermore, if the number of robots 100 is plural, each of the plurality of robots may be configured to provide a service in at least one floor. In other words, the robot 100 may be configured to provide a service in one or more floors and the plurality of robots may be configured to provide a service in one floor, depending on the type of service/provision frequency and/or a form/structure of a building (or floor).

Services provided by the robot 100 may include at least one of a parcel delivery service, a beverage (e.g., coffee) delivery service based on an order, a cleaning service, and other information/content provision service, for example.

At least some of the movements of the robot 100, the provision of a service by the robot 100, and a summons on the elevator 120 may be performed through the robot control system 140. For example, in response to a summons from the robot control system 140, the EV control system 130 may move a proper elevator (e.g., 120) to a floor where the robot 100 is located. The configurations of the robot 100 and the robot control system 140 are described more specifically with reference to FIGS. 2 and 4.

The EV control system 130 may detect that at least one robot 100 gets on the elevator 120, and may control the elevator 120 to move to a floor where the robot 100 will provide a service. The EV control system 130 may configure at least one of the internal user interface and external user interface of the elevator 120 to indicate whether the robot 100 is using the elevator. The internal user interface may include a display and buttons, for example, within the elevator 120. The internal user interface is more specifically described with reference to FIG. 12. The external user interface may include a display and buttons, for example, outside the elevator 120. The external user interface is more specifically described with reference to FIG. 11.

In an embodiment, since at least one of the internal user interface and external user interface of the elevator 120 is configured to indicate whether the robot 100 is using the elevator 120, a user who tries to use the elevator 120 may check whether the robot 100 gets on the elevator 120 or the elevator 120 has been set as a dedicated elevator for the robot.

Accordingly, according to an embodiment, a user may not use an elevator or a (robot-) dedicated elevator used by the robot. Interference between the robot and the user in using the elevator can be minimized.

Figure 2:
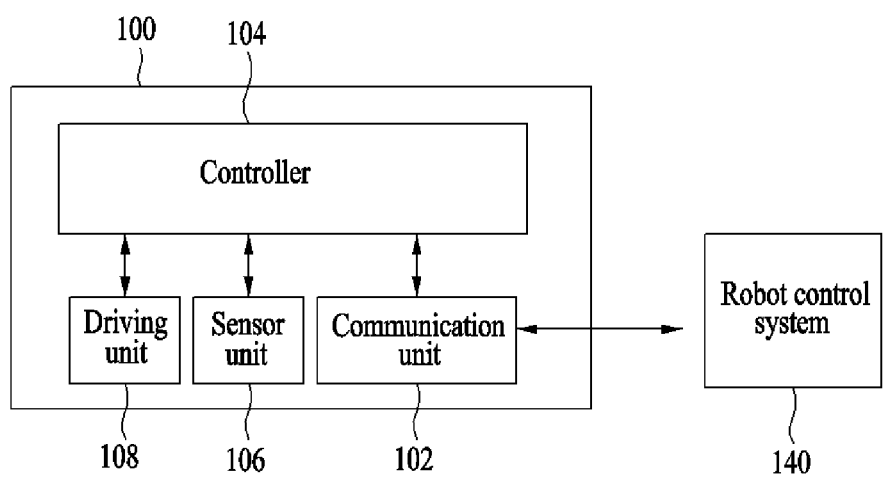
FIG. 2 illustrates a block diagram of a robot that provides a service in a building according to an embodiment.

FIG. 2 illustrates a block diagram of a robot that provides a service in a building according to an embodiment.

As described above, the robot 100 may be a service robot used to provide a service within a building. The robot 100 may provide a service to a user within a building at a given location (or a specific floor) of the building through autonomous driving.

The robot 100 may be a physical device, and may include a controller 104, a driving unit 108, a sensor unit 106 and a communication unit 102, as illustrated in FIG. 2.

The controller 104 may be a physical processor embedded in the robot 100, and may include a path planning processing module, a mapping processing module, a driving control module, a localization processing module, a data processing module and a service processing module. In this case, the path planning processing module, the mapping processing module, and the localization processing module may be optionally included in the controller 104 in order for indoor autonomous driving of the robot 100 to be performed when communication with the robot control system 140 is not performed.

The communication unit 102 may be an element for enabling the robot 100 to communicate with another device (e.g., another robot or the robot control system 140). In other words, the communication unit 102 may be an antenna of the robot 100, a hardware module, such as a data bus, a network interface card, a network interface chip or a networking interface port, or a software module, such as a network device driver or a networking program, which transmits/receives data and/or information to/from another device.

The driving unit 108 is an element that controls the movements of the robot 100, and may include equipment for the control.

The sensor unit 106 may be an element for collecting data necessary for autonomous driving of the robot 100 and necessary to provide a service by the robot. The sensor unit 106 may not necessarily include expensive sensing equipment, and may include a sensor, such as a cheap ultrasonic sensor and/or a cheap camera.

For example, the data processing module of the controller 104 may transmit, to the robot control system 140, sensing data including an output value of sensors of the sensor unit 106 through the communication unit 102. The robot control system 140 may transmit, to the robot 100, path data generated using an indoor map within the building 130. The path data may be delivered to the data processing module through the communication unit 102. The data processing module may directly transmit the path data to the driving control module. The driving control module may control indoor autonomous driving of the robot 100 by controlling the driving unit 108 based on the path data.

If the robot 100 and the robot control system 140 cannot communicate with each other, the data processing module may directly process indoor autonomous driving of the robot 100 by transmitting sensing data to the localization processing module and generating path data through the path planning processing module and the mapping processing module.

The robot 100 may be different from a mapping robot used to generate an indoor map within the building 130. In this case, the robot 100 may process indoor autonomous driving using an output value of a sensor, such as a cheap ultrasonic sensor and/or a cheap camera, because the robot does not include expensive sensing equipment. If the robot 100 had processed indoor autonomous driving through communication with the robot control system 140, cheap sensors can be used and more accurate indoor autonomous driving may be made because mapping data included in path data already received from the robot control system 140 is used.

The service processing module may receive an instruction, received through the robot control system 140, through the communication unit 102 or the communication unit 102 and the data processing module. The driving unit 108 may further include equipment related to a service provided by the robot 100, in addition to equipment for the movements of the robot 100. For example, in order to perform a food and drink/delivery goods delivery service, the driving unit 108 of the robot 100 may include a configuration for loading food and drink/delivery goods or a configuration (e.g., a robot arm) for delivering food and drink/delivery goods to a user. Furthermore, the robot 100 may further include a speaker and/or a display for providing information/content. The service processing module may transmit, to the driving control module, a driving instruction for a service to be provided. The driving control module may control the robot 100 or an element included in the driving unit 108 based on the driving instruction so that the service is provided.

The robot 100 may detect a summoned elevator 120 through control of the robot control system 140, and may get on the summoned elevator 120. When the elevator 120 arrives at a floor where the robot 100 will provide a service, the robot 100 may get off the elevator 120 and provide service in the corresponding floor.

The EV control system 130 that controls the elevator 120 for enabling the robot 100 to get on an elevator 110 and the robot control system 140 are more specifically described with reference to FIGS. 3 and 5, respectively.

The description of the technical characteristics described with reference to FIG. 1 may also be applied to FIG. 2 without any change, and thus a redundant description thereof is omitted.

Figure 3:
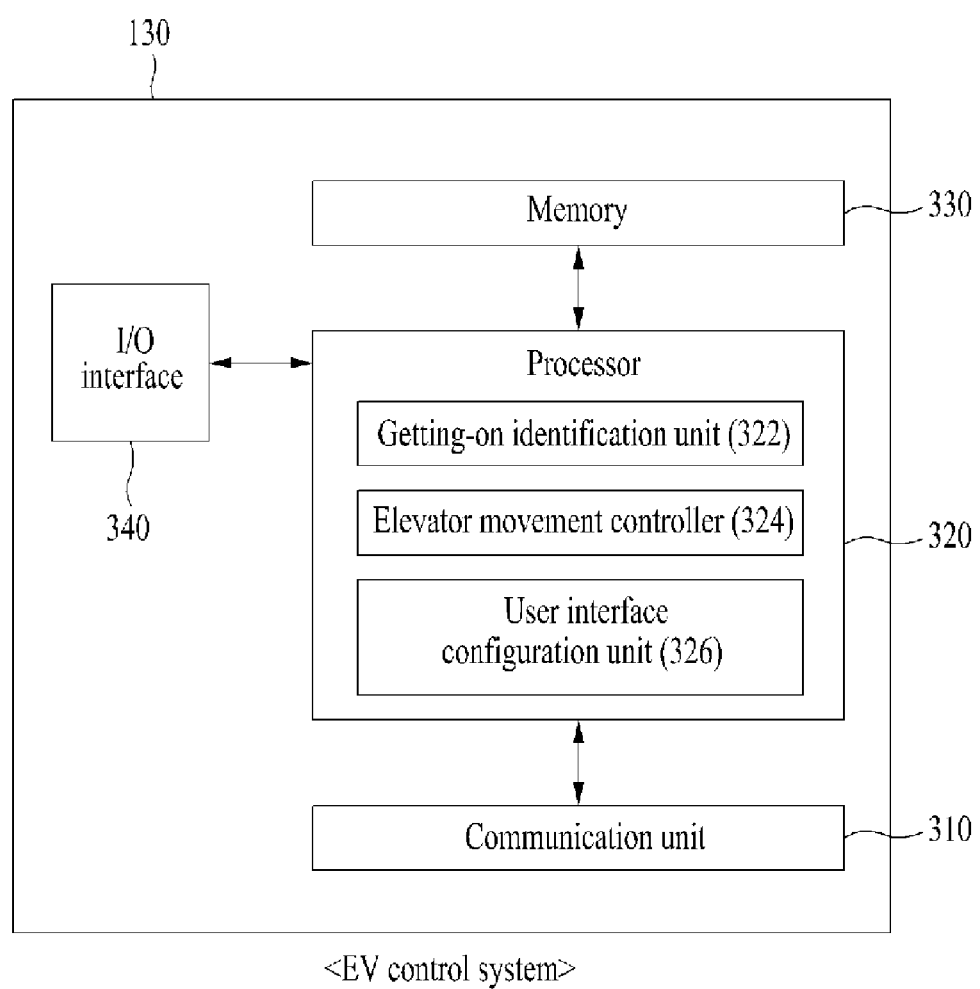
FIG. 3 is a block diagram illustrating a system for controlling an elevator on which the robot will ride according to an embodiment.

FIG. 3 is a block diagram illustrating the EV control system 130 for controlling the elevators 110 on which the robot 100 will get on and off according to an embodiment.

The EV control system 130 may be an apparatus for controlling a summons of the elevators 110 and the movements of the elevators 110 within a building. The EV control system 130 may include at least one computing device, and may be implemented as a service located inside or outside the building.

As illustrated in FIG. 3, the EV control system 130 may include a memory 330, a processor 320, a communication unit 310, and an input and output (I/O) interface 340.

The memory 330 is a computer-readable recording medium, and may include a random access memory (RAM), a read only memory (ROM), and a permanent mass storage device such as or a disk drive. The ROM and the permanent mass storage device may be separated from the memory 330 and may be included as a separate permanent storage device. Furthermore, an operating system and at least one program code may be stored in the memory 330. Such software elements may be loaded from a computer-readable recording medium different from the memory 330. Such a separate computer-readable recording medium may include computer-readable recording media, such as a floppy drive, a disk, a tape, a DVD/CD-ROM drive, and a memory card. In another embodiment, the software elements may be loaded onto the memory 330 through the communication unit 310, and not computer-readable recording media.

The processor 320 may be configured to process an instruction of a computer program by performing basic arithmetic, logic, and I/O operations. The instruction may be provided to the processor 320 by the memory 330 or the communication unit 310. For example, the processor 320 may be configured to execute an instruction received based on a program code loaded onto the memory 330. As illustrated, the processor 320 may include a getting-on identification unit 322, a elevator movement controller 324, and a user interface configuration unit 326.

Each of the elements 322 to 326 of the processor 320 may be a software and/or hardware module as part of the processor 320, and may indicate a function block implemented by the processor. The getting-on identification unit 322 may detect that the robot 100 providing a service in at least one floor gets on the elevator 120 that moves through floors within a building. The elevator movement controller 324 may control the elevator 120 on which the robot 100 has gotten on to move to a floor where the robot 100 will provide a service. The user interface configuration unit 326 may configure at least one of the internal user interface and an external user interface of the elevator 120 to indicate whether the robot 100 is using the elevator 120.

The communication unit 310 may be an element for enabling the EV control system 130 to communicate with another device (e.g., the elevators 110 or the robot control system 140). In other words, the communication unit 310 may be an antenna of the robot control system 130, a hardware module, such as a data bus, a network interface card, a network interface chip or a networking interface port, and a software module, such as a network device driver or a networking program, which transmits/receives data and/or information to/from another device.

The I/O interface 340 may be means for interfacing with an input device, such as a keyboard or a mouse, and an output device, such as a display or a speaker.

Furthermore, in other embodiments, the EV control system 130 may include more elements than the illustrated elements.

A method of controlling the elevator 120 for the robot 100 to get on, performed by the elements 322 to 326 of the processor 320, is more specifically described with reference to FIGS. 5 to 17.

The description of the technical characteristics described with reference to FIGS. 1 and 2 may also be applied to FIG. 3 without any change, and thus a redundant description thereof is omitted.

Figure 4:
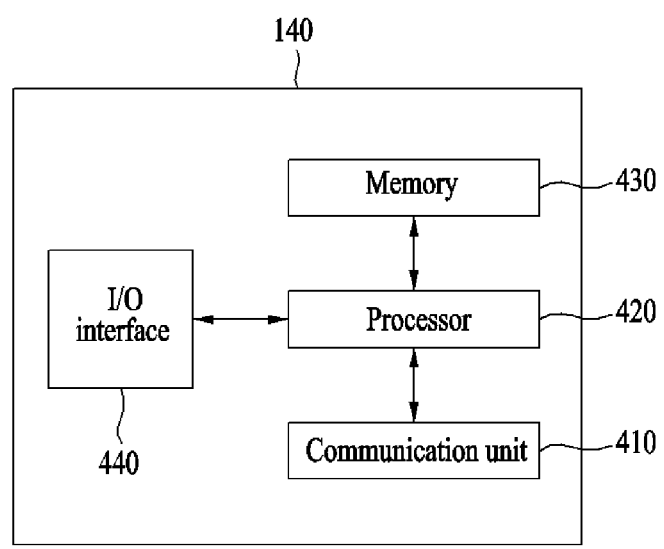
FIG. 4 is a block diagram of a robot control system controlling the robot that provides a service in a building according to an embodiment.

FIG. 4 is a block diagram of the robot control system 140 for controlling the robots 100 that provides services in a building according to an embodiment.

The robot control system 140 may be an apparatus for controlling the movements of the robot 100 and the provision of a service by the robot 100 within a building. The robot control system 140 may control the movements of each of a plurality of the robots and the provision of a service by each of the robots. The robot control system 140 may summon an elevator 110 in order to move the robot 100 to a floor where the robot 100 will provide a service through communication with the EV control system 130. The robot control system 140 may control the robot 100 to recognize and get on the summoned elevator 120, and may control the robot 100 to get off the elevator 120 on a floor where a service will be provided.

The robot control system 140 may include at least one computing device, and may be implemented as a server located inside or outside the building in which the robot 100 is provided. The robot control system 140 may be implemented as a cloud server (or system).

As illustrated in FIG. 4, the robot control system 140 may include a memory 430, a processor 420, a communication unit 410, and an I/O interface 440. The description of common technical characteristics of the elements 310 to 340 of the EV control system 130 may be applied to common description of the elements 410 to 430 of the robot control system 140 without any change, and thus a redundant description thereof is omitted.

The description of the technical characteristics described with reference to FIGS. 1 to 3 may also be applied to FIG. 4 without any change, and thus a redundant description thereof is omitted.

Figure 5:
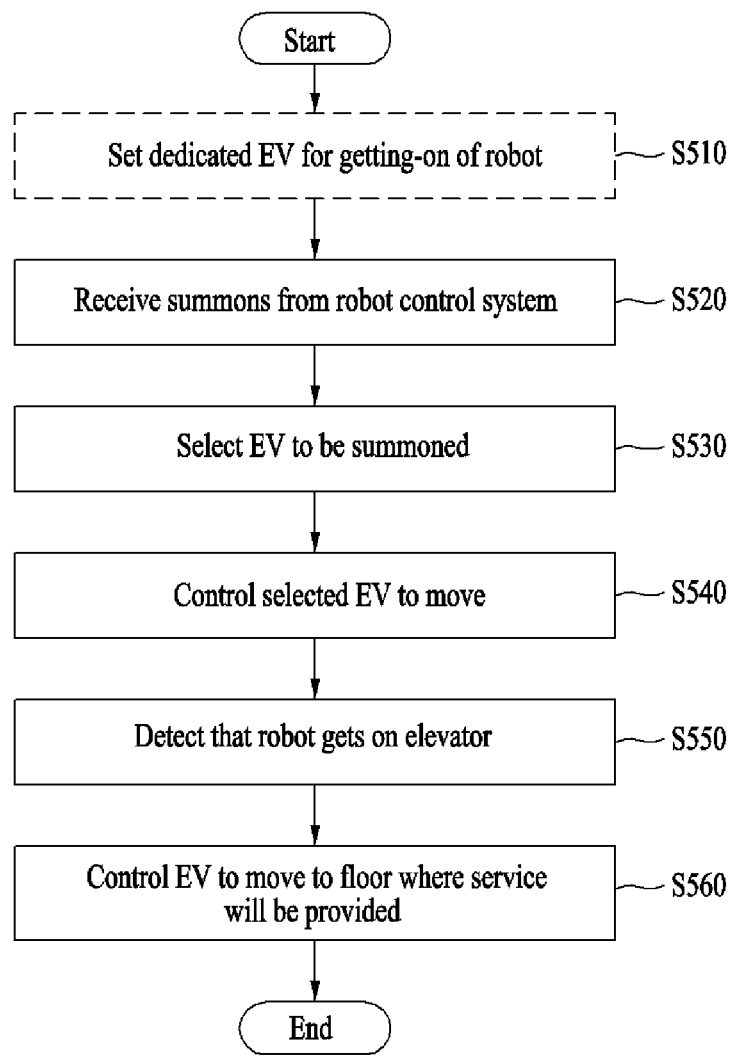
FIG. 5 is a flowchart illustrating an elevator control method for a robot passenger according to an embodiment.

FIG. 5 is a flowchart illustrating an elevator control method for enabling a robot 100 to get on the elevator 120 according to an embodiment.

An elevator control method for summoning the elevator 120 in response to an elevator summons from the robot control system 140 and moving the elevator 120 on which the robot 100 has gotten on to a floor where the robot 100 will provide a service, performed by the EV control system 130, is described more specifically with reference to FIG. 5.

At step S510, the processor 320 may set at least one of the plurality of elevators 110, provided within a building, as a dedicated elevator for the robot 100. For example, the processor 320 may set any one of the elevators 110 as a dedicated elevator for the robot 100 for a given time period. The given time period may be a time zone in which users within a building use the elevators 110 less in their daily routines. The given time period may be a time period between p.m. 2 and p.m. 4, for example. The given time period may be preset by the administrator of the EV control system 130. For example, the elevator 120 described with reference to FIG. 1 may be a dedicated elevator.

The user interface configuration unit 326 may configure at least one of the external user interface and the internal user interface of the elevator 120, set as a dedicated elevator, to indicate that the elevator 120 has been set as the dedicated elevator for the robot 100. For example, an image of the robot may be displayed on a display corresponding to the external user interface of the elevator 120.

A detailed method of configuring, by the user interface configuration unit 326, the internal user interface and/or the external user interface of the elevator 120 may be performed if the elevator 120 has been set as a dedicated elevator, regardless of whether the robot 100 actually gets on the elevator 120. Alternatively, such a detailed method of configuring the internal user interface and/or the external user interface of the elevator 120 may be performed if the robot 100 gets on the elevator 120 or the elevator 120 is summoned by the robot control system 140 although the elevator 120 has not been set as a dedicated elevator. Accordingly, although step S510 is not performed, an elevator control method according to an embodiment may be performed.

The dedicated elevator 120 may be an elevator whose use priority is given to the robot 100 and which is recommended to be used by the robot 100 (in the external user interface and/or the internal user interface), and may not be an elevator whose use by a common user is not fully excluded. In other words, other users may use the elevator in some cases (e.g., when there is no robot passenger in the elevator).

At step S520, the EV control system 130 may receive an elevator summons from the robot control system 140. The summons may include information on a floor where the robot 100 is located. In some embodiments, such summons may be directly transmitted from the robot 100 to the EV control system 130. The summons may further include information on a floor where the robot 100 will provide a service. Furthermore, the summons may further include information on an expected time when the robot 100 will arrive at the waiting space (or elevator room) of the elevator 120, information on a required space within the elevator 120, and information on whether speediness is necessary (e.g., speediness may be necessary if the robot 100 performs a delivery, but may not be necessary if the robot 100 is returning to its original location).

At step S530, the EV control system 130 may select the elevator 120 (i.e., an elevator to be summoned) to be moved to the floor where the robot 100 is located among the elevators 110 based on the received summons. For example, the EV control system 130 may select, as the elevator 120 to be summoned, the elevator set as the dedicated elevator at step S510. Alternatively, the EV control system 130 may select, as the elevator 120 to be summoned, an elevator closest to a floor indicated by the summons, among the elevators 110. Alternatively, the EV control system 130 may calculate the time taken to move to the floor indicated by a summons on each of the elevators 110, and may select, as the elevator 120 to be summoned, an elevator which can most quickly move to the floor indicated by the summons (e.g., an elevator having the smallest number of floors where the elevator must stop before the elevator moves to the floor indicated by the summons).

Furthermore, the EV control system 130 may not select, as the elevator 120 to be summoned, an elevator used for a special purpose (e.g., for moving in or moving out, during maintenance, or for use by a VIP) or an elevator in a full capacity state, among the elevators 110.

At step S540, the EV control system 130 may control the selected elevator 120 to move to the floor indicated by the summons. When the elevator 120 moves to the floor indicated by the summons and the door of the elevator is opened, the robot 100 may get on the elevator 120.

At step S550, the getting-on identification unit 322 may detect that the robot 100 has gotten on the elevator 120.

The identification (or detection) of the robot 100 getting on the elevator 120 may be performed by wireless communication through the robot 100 and the elevator 120. For example, the identifier (not illustrated) of the robot 100 may be transmitted from the robot 100 to the elevator 120 through wireless communication (e.g., short-distance wireless communication (e.g., through Wi-Fi, infrared rays, Bluetooth, an AP signal or a beacon signal)). The getting-on identification unit 322 may recognize that the robot 100 has gotten on the elevator 120 by recognizing the transmission of the identifier.

Alternatively, when the robot 100 gets on the elevator 120, the robot 100 may notify the robot control system 140 of its entry. The getting on of the robot 100 on the elevator 120 may be detected when the robot control system 140 notifies the EV control system 130 that the robot 100 has gotten on the elevator 120.

In addition, any type of a detection method may be applied to the method of detecting, by the getting-on identification unit 322, that the robot 100 has gotten on the elevator 120.

When the robot 100 gets on the elevator 120, the riding of the robot 100 on the elevator 120 may be displayed in the external user interface of the elevator 120. Furthermore, the riding of the robot 100 on the elevator 120 may also be displayed in the internal user interface of the elevator 120. A floor where the robot 100 will provide a service may be displayed in the internal user interface of the elevator 120. That is, a floor where the robot 100 will get off in order to provide a service may be displayed in the internal user interface of the elevator 120. Control of the display of the external user interface and the internal user interface may be performed by the user interface configuration unit 326.

At step S560, the elevator movement controller 324 may control the elevator 120 on which the robot 100 has gotten on to move to a floor where the robot 100 will provide a service. The elevator movement controller 324 may automatically move the elevator 120 to the floor where the robot 100 will provide a service, based on information included in the summons. Alternatively, when the robot 100 gets on the elevator 120, information on the floor where the robot 100 will provide a service may be transmitted to the EV control system 130 through wireless communication between the robot 100 and the elevator 120 or notification from the robot control system 140 to the EV control system 130.

The elevator movement controller 324 may control the elevator 120 to move to the floor where the robot 100 will provide a service, based on the information on the floor where the robot 100 will provide a service. Accordingly, when the robot 100 gets on the elevator 120, the elevator 120 may automatically move to the floor where the robot 100 will provide a service (without a separate floor input).

When the elevator 120 moves to the floor where the robot 100 will provide a service, the door of the elevator 120 is opened, and the robot 100 may get off the elevator and provide a service in the corresponding floor.

The user interface configuration unit 326 may configure at least one of the internal user interface and external user interface of the elevator 120 to indicate whether the robot 100 is using an elevator. For example, as described above, the user interface configuration unit 326 may configure at least one of the external user interface and the internal user interface to indicate that the elevator 120 has been set as a dedicated elevator or, in addition, may configure at least one of the external user interface and the internal user interface to indicate that the robot 100 has gotten on the elevator 120.

If the elevator 120 has been set as a dedicated elevator or the robot 100 has gotten on the elevator 120, the EV control system 130 may control the elevator 120 not to move to a floor summoned by a user although the summons from the user who wants to use the elevator 120 is present. That is, if the elevator 120 has been set as a dedicated elevator or the robot 100 has gotten on the elevator 120, the elevator 120 may be controlled to give priority to the use of the robot 100 over a summons by a user.

The description of the technical characteristics described with reference to FIGS. 1 to 4 may also be applied to FIG. 5 without any change, and thus a redundant description thereof is omitted.

Figure 6:
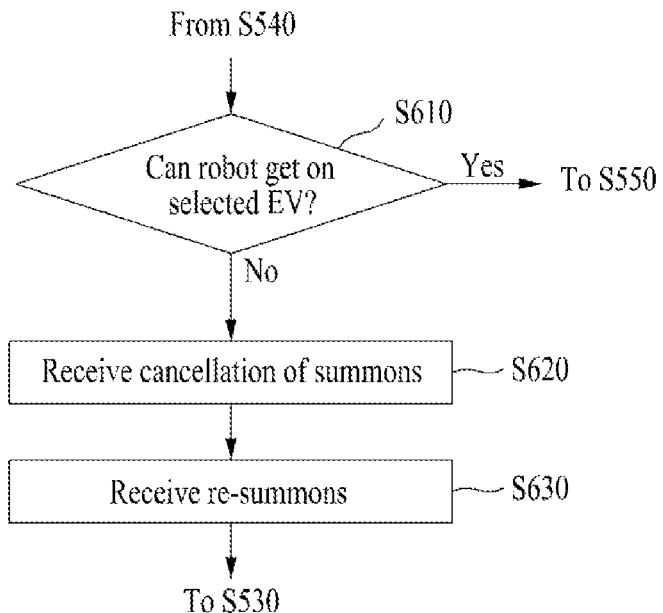
FIG. 6 is a flowchart illustrating a method of summoning an elevator depending on whether a robot may get on a summoned elevator according to an embodiment.

FIG. 6 is a flowchart illustrating a method of summoning an elevator depending on whether the robot gets on a summoned elevator according to an example.

In the case where a summoned elevator 120 arrives at a floor where the robot 100 will get on, an elevator control method if the robot 100 cannot get on the elevator 120 is described with reference to FIG. 6.

At step S610, when the summoned elevator 120 arrives at the floor where the robot 100 will get on, whether the robot 100 can get on the elevator 120 may be determined. For example, the robot 100 (or the robot control system 140) may determine whether the robot 100 can get on the elevator 120 based on whether a sufficient space is present in the elevator 120 on which the robot 100 will get.

If it is determined that there is a sufficient space, the robot 100 may get on the elevator 120.

If it is determined that the robot 100 cannot get on the elevator 120, at step S620, the EV control system 130 may receive a cancellation of a summons on the elevator 120 from the robot control system 140. Furthermore, at step S630, the EV control system 130 may receive, from the robot control system 140, again a summons, including information on a floor where the robot 100 is located, as a summons for requesting another elevator.

In other words, if it is determined that the robot 100 cannot get on the elevator 120, the robot control system 140 may transmit a cancellation of the summons on the elevator 120 from the EV control system 130, and may transmit a summons, including information on the floor where the robot 100 is located, again in order to request another elevator.

In response to the summons on another elevator, the EV control system 130 may select another elevator to be moved to the floor where the robot 100 is located, and may control the other elevator to move to the corresponding floor.

According to such an embodiment, a proper elevator for the robot 100 may be summoned by considering a degree of congestion within the elevator 120.

In another embodiment, if it is determined that the robot 100 cannot get on the elevator 120, the user interface configuration unit 326 may configure the internal user interface of the elevator 120 to output an indicator that induces a user who has gotten on the elevator 120 to get off the elevator 120. For example, the user interface configuration unit 326 may output a visual indicator and/or an auditory indicator through the internal user interface. The indicator may be output until a space sufficient for the robot 100 to get on the elevator 120 is secured as a user (or robot) who (or that) has gotten on the elevator 120 gets off. If the space sufficient for the robot 100 to get on the elevator 120 is secured in the elevator 120, the robot 100 may get on the elevator 120.

The description of the technical characteristics described with reference to FIGS. 1 to 5 may also be applied to FIG. 6 without any change, and thus a redundant description thereof is omitted.

Figure 7:
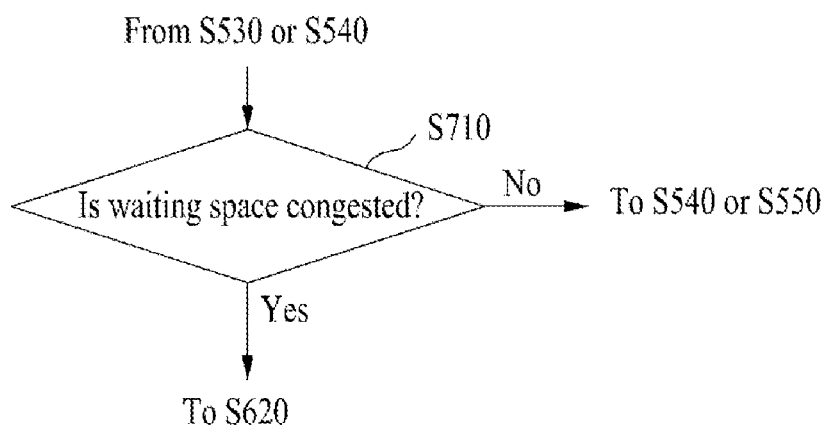
FIG. 7 is a flowchart illustrating a method of summoning an elevator depending on whether a waiting space for an elevator to be summoned is congested according to an embodiment.

FIG. 7 is a flowchart illustrating a method of summoning an elevator again depending on whether a waiting space for an elevator to be summoned is congested according to an example.

In the case where the waiting space of the elevator 120 is congested before a summoned elevator 120 arrives at a floor where the robot 100 will get on (or even after the arrival), an elevator control method is described with reference to FIG. 7.

At step S710, before the elevator 120 arrives at the floor where the robot 100 will get on (or even after the arrival), whether a space (i.e., the waiting space) for waiting for the arrival of the elevator 120 is congested may be determined. For example, the robot 100 (or the robot control system 140) may determine that the waiting space is congested when a given number of users or robots or more are present in the waiting space for the getting-on of the elevator 120.

If it is determined that the waiting space is not congested, the robot 100 may get on the elevator 120.

If it is determined that the waiting space is congested, the EV control system 130 may receive a cancellation of a summons on the elevator 120 from the robot control system 140. Furthermore, the EV control system 130 may receive, from the robot control system 140, a summons again, including information on a floor where the robot 100 is located, as a summons for requesting another elevator.

In other words, if it is determined that the waiting space is congested, the robot control system 140 may transmit a cancellation of the summons on the elevator 120 to the EV control system 130, and may transmit a summons, including information on the floor where the robot 100 is located, again in order to request another elevator.

In response to the summons on another elevator, the EV control system 130 may select another elevator to be moved to the floor where the robot 100 is located, and may control the other elevator to move to the corresponding floor.

The description of the technical characteristics described with reference to FIGS. 1 to 6 may also be applied to FIG. 7 without any change, and thus a redundant description thereof is omitted.

Figure 8:
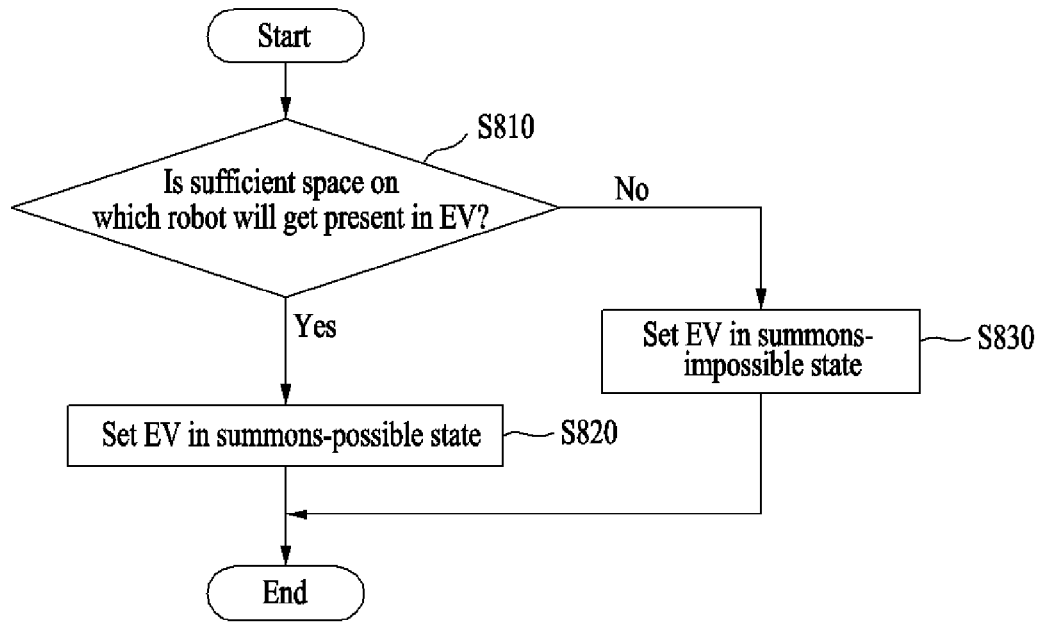
FIG. 8 is a flowchart illustrating a method of setting an elevator in a summons-possible/summons-impossible state depending on whether the robot may get on the elevator to be summoned according to an embodiment.

FIG. 8 is a flowchart illustrating a method of setting an elevator in a summons-possible/summons-impossible state depending on whether the robot may get on the elevator to be summoned according to an example.

At step S810, the EV control system 130 may determine whether a space sufficient for the robot 100 to get on the elevator 120 is present in the elevator 120. For example, whether the space sufficient for the robot 100 to get on the elevator 120 is present in the elevator 120 may be detected by the robot 100 that has gotten on the elevator 120 or the robot 100 that will get on the elevator 120, and may be transmitted from the robot control system 140 to the EV control system 130 (or directly through the robot 100).

Alternatively, whether the space sufficient for the robot 100 to get on the elevator 120 is present in the elevator 120 may be detected by a sensor included in the elevator 120. For example, this may be determined by a camera installed in the elevator 120 or a weight sensor installed in the elevator 120.

If it is determined that the space sufficient for the robot 100 to get on the elevator 120 is present in the elevator 120, at step S820, the EV control system 130 may set the elevator 120 in the summons-possible state.

If it is determined that the space sufficient for the robot 100 to get on the elevator 120 is not present in the elevator 120, at step S830, the EV control system 130 may set the elevator 120 in the summons-impossible state. For example, in such a case, the EV control system 130 may set the elevator 120 in a full state. The elevator 120 set in the full state may be set in the summons-impossible state.

The user interface configuration unit 326 may configure the internal user interface of the elevator 120 to output an indicator indicative of the full state. Such an indicator may be an indicator that induces a user who has gotten on the elevator 120 to get off the elevator 120. For example, the user interface configuration unit 326 may output a visual indicator and/or an auditory indicator through the internal user interface. Such an indicator may be output until a space sufficient for the robot 100 to get on the elevator 120 is secured as a user (or robot) who (or that) has gotten on the elevator 120 gets off. If the space sufficient for the robot 100 to get on the elevator 120 is secured, the output of the indicator may be stopped, and the full state may also be released. When the full state is released (i.e., when the space sufficient for the robot 100 to get on the elevator 120 is secured), the elevator 120 may be set in the summons-possible state.

Whether the elevator 120 is in the full state may also be displayed in the external user interface of the elevator 120.

The description of the technical characteristics described with reference to FIGS. 1 to 7 may also be applied to FIG. 8 without any change, and thus a redundant description thereof is omitted.

Figure 9:
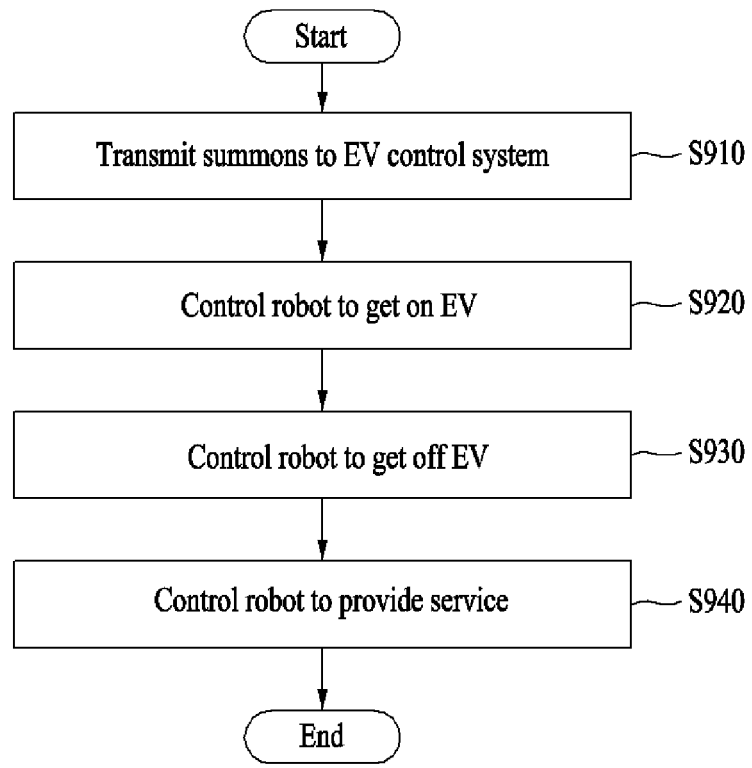
FIG. 9 is a flowchart illustrating a method of summoning, by a control system controlling the robot, an elevator on which the robot will get on and controlling the robot to get on the elevator according to an embodiment.

FIG. 9 is a flowchart illustrating a method of summoning, by the robot control system 140 controlling the robot 100, an elevator 120 on which the robot will get on and controlling the robot to get on the elevator according to an embodiment.

An operation from a viewpoint of the robot control system 140 is described below with reference to FIG. 9.

At step S910, the robot control system 140 may transmit, to the EV control system 130 controlling the elevators 110, a summons including information on a floor where the robot 100 is located and a floor where the robot 100 will provide a service.

At step S920, the robot control system 140 may control the robot 100 to get on the elevator 120 moving to the floor where the robot 100 is located, in response to the summons.

The elevator 120 may be automatically moved to the floor where the robot 100 will provide a service, based on information on the floor where the robot 100 will provide a service, which is included in the summons.

Alternatively, (if the summons does not include information on the floor where the robot 100 will provide a service,) when the robot 100 gets on the elevator 120, the robot control system 140 may transmit, to the EV control system 130, information on the floor where the robot 100 will provide a service. Accordingly, the EV control system 130 may automatically move the elevator 120 to the floor where the service will be provided.

When the elevator 120 arrives at the floor where the robot 100 will provide a service, at step S930, the robot control system 140 may control the robot 100 to get off the elevator 120.

At step S940, the robot control system 140 may control the robot 100 to provide the service on the floor where the robot 100 will provide the service.

As described above, if a given number of users or robots or more are present in the waiting space of the elevator 120 that moves to a floor where the robot 100 is located in response to a summons or if the robot 100 cannot get on the elevator 120 that has moved to the floor where the robot 100 is located in response to a summons, the robot control system 140 may transmit a cancellation of the summons to the EV control system 130, and may transmit a summons for requesting another elevator to the EV control system 130.

The aforementioned steps may be implemented by the robot 100 not the robot control system 140, depending on a configuration of an embodiment.

The description of the technical characteristics described with reference to FIGS. 1 to 8 may also be applied to FIG. 9 without any change, and thus a redundant description thereof is omitted.

Figure 10:
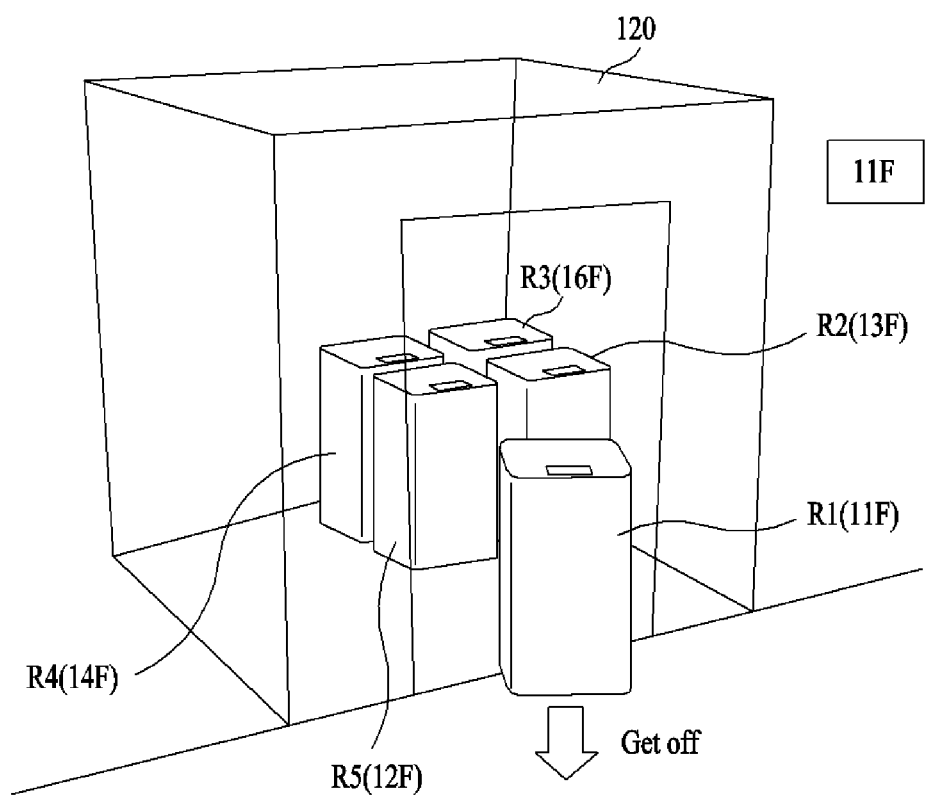
FIG. 10 illustrates a case where a plurality of robots get on and off an elevator according to an example.

FIG. 10 illustrates a case where a plurality of robots get on and off an elevator according to an example.

An illustrated elevator 120 may be set as a common elevator or a dedicated elevator 120 for the robot 100.

FIG. 10 illustrates a case where a plurality of robots R1 to R5 has gotten on the elevator 120 and when the elevator 120 arrives at an eleventh floor, the robot R1 configured to provide a service at the eleventh floor gets off the elevator 120. In the illustrated example, the robot R1 has been configured to provide a service at an eleventh floor, the robot R2 has been configured to provide a service at a thirteenth floor, the robot R3 has been configured to provide a service at a sixteenth floor, the robot R4 has been configured to provide a service at a fourteenth floor, and the robot R5 has been configured to provide a service at a twelfth floor.

The getting-on identification unit 322 may detect that each of the robots R1 to R5 has gotten on the elevator 120 (refer to step S550).

The elevator movement controller 324 may control the elevator 120 to sequentially move to floors where the plurality of robots R1 to R5 will provide services, respectively (refer to step S560).

Each of the plurality of robots R1 to R5 may have gotten on the elevator 120 in response to a summons on the elevator 120 based on a request associated with each of the robots.

That is, the EV control system 130 may receive, from the robot control system 140, the summons associated with each of the plurality of robots R1 to R5 at step S520, and may select an elevator to be summoned on the floor indicated by each summons at step S530. The number of summoned elevators may be plural. In the illustrated example, the elevator 120 has been selected and summoned.

At step S540, the EV control system 130 may control the elevator 120 so that the robot R3 to get off the elevator 120 last, among the plurality of robots R1 to R5, gets on the elevator 120 first. In the illustrated example, since the robot R1, the robot R5, the robot R2, the robot R4, and the robot R3 will sequentially get off the elevator 120, the elevator 120 may be controlled so that the robot R3, the robot R4, the robot R2, the robot R5, and the robot R1 sequentially get on the elevator 120 (i.e., regardless of a summons sequence). According to such an embodiment, the plurality of robots R1 to R5 get off the elevator 120 at respective floors where they will provide services without interference between the plurality of robots R1 to R5. Such an embodiment may be performed if a plurality of summons is present within a given (relatively short) time.

Alternatively, the getting on of the plurality of robots R1 to R5 on the elevator 120 may be performed regardless of the sequence of summons. As the plurality of robots R1 to R5 properly moves within the elevator 120, the robot R1 that first gets off the elevator 120 may be disposed in front (i.e., the side close to the door of the elevator 120).

The plurality of robots R1 to R5 may get on the elevator 120 as a group in one floor.

The description of the technical characteristics described with reference to FIGS. 1 to 9 may also be applied to FIG. 10 without any change, and thus a redundant description thereof is omitted.

Figure 11:
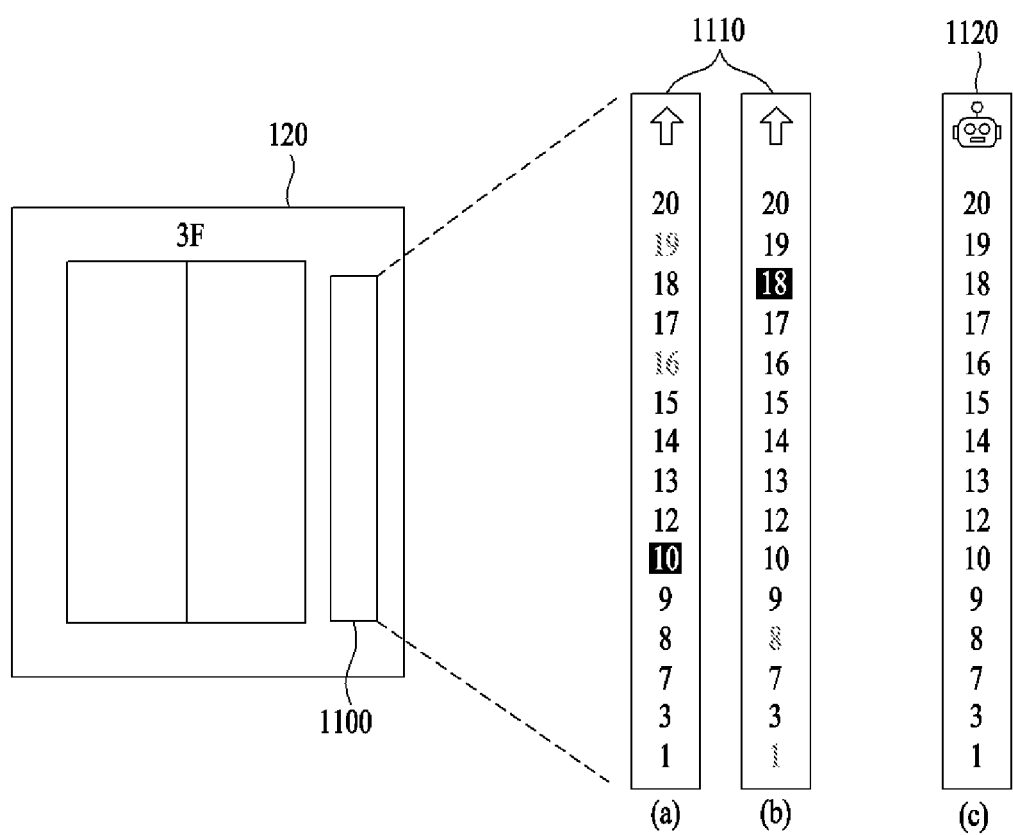
FIG. 11 illustrates an external user interface of an elevator according to an example.

FIG. 11 illustrates the external user interface of an elevator according to an example.

As illustrated in FIG. 11, the external user interface of the elevator 120 may be positioned on one side (or both sides) of the door outside the elevator 120. The external user interface may include a display.

An external user interface 1110 illustrates an external user interface in a common use. An external user interface 1120 illustrates an external user interface when the elevator 120 is set as a (robot-) dedicated elevator.

As illustrated in FIG. 11, whether the elevator 120 goes up or down ((a): up (upward arrow) and (b) down (downward arrow)), the current location ((a): 10 floor or (b): 18 floor) of the elevator 120, and a floor ((a): 19 floor and 16 floor, (b): 8 floor and 1 floor) where the elevator 120 is scheduled to stop may be displayed in the external user interface 1110.

An image (or an image having a robot shape) indicating that the elevator 120 has been set as a dedicated elevator may be displayed in the external user interface 1120. Whether the elevator 120 goes up or down, the current location of the elevator 120, and a floor where the elevator 120 is scheduled to stop may not be displayed in the external user interface 1120.

That is, the user interface configuration unit 326 configures the external user interface 1120 of the elevator 120 to display that the robot 100 has gotten on the elevator 120 or that the elevator 120 is being used as a dedicated elevator for the robot 100, but not to display whether the elevator 120 goes up or down, the current location of the elevator 120 or a floor where the elevator 120 is scheduled to stop (or at least one of them). According to such a configuration of the external user interface 1120, a user may refrain from using the elevator 120 used by the robot 100 or from using a robot-dedicated elevator.

Figure 12:
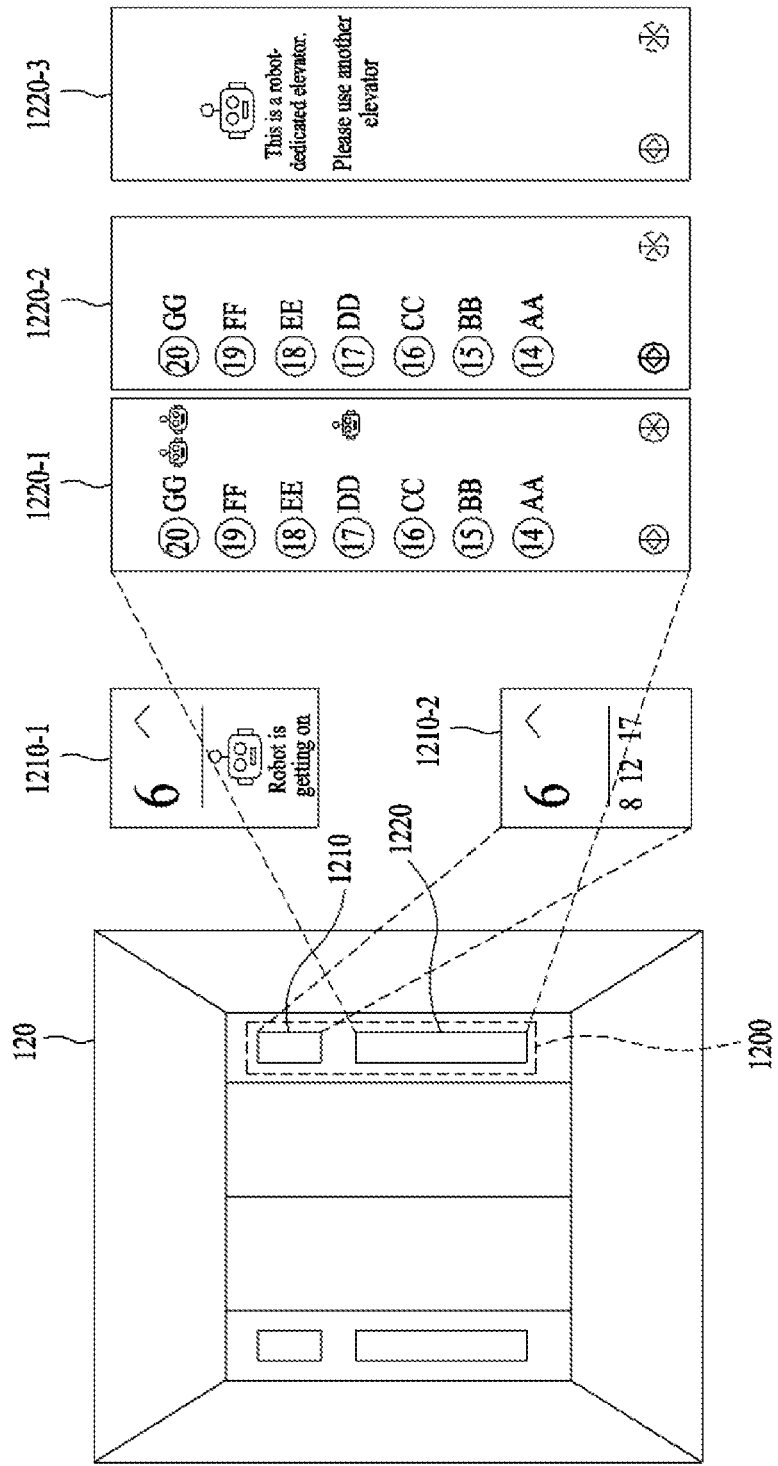
FIG. 12 illustrates an internal user interface of an elevator according to an example.

An image indicative of the use of the elevator 120 for a special purpose may be displayed in a state display area of the external user interface 1120 in which the image having a robot shape in FIG. 12 is displayed. The special purpose may include a VIP use, a full state, moving in or moving out, for example.

In the case of a dedicated elevator, the use of the dedicated elevator by a common user is not fully excluded. Accordingly, if a user gets on the elevator 120 set as a dedicated elevator, the user may move to a desired floor by manipulating the internal user interface (e.g., floor selection button) of the elevator 120.

The description of the technical characteristics described with reference to FIGS. 1 to 10 may also be applied to FIG. 11 without any change, and thus a redundant description thereof is omitted.

FIG. 12 illustrates the internal user interface of an elevator according to an example.

As illustrated in FIG. 12, the internal user interface 1200 of the elevator 120 may be disposed on both sides (or one side) of the door inside the elevator 120. The internal user interface may include a display and buttons.

As illustrated, the internal user interface 1200 may be configured with a first part 1210 (i.e., illustrated first parts 1210-1 and 1210-2) and a second part 1220 (i.e., illustrated second parts 1220-1 to 1220-3).

The first part 1210-2 illustrates a configuration of the internal user interface 1200 in a common use of the elevator 120. Whether the elevator 120 goes up or down, the current location of the elevator 120, and a floor where the elevator 120 is scheduled to stop may be displayed in the first part 1210-2.

The first part 1210-1 illustrates a configuration of the internal user interface 1200 when the robot 100 uses the elevator 120. Whether the elevator 120 goes up or down, the current location of the elevator 120, and an indicator indicating that the robot 100 is getting on the elevator 120 may be displayed in the first part 1210-1. Unlike in the illustrated examples, only an indicator indicating that the robot 100 is getting on the elevator 120 may be displayed in the first part 1210-1, and whether the elevator 120 goes up or down and/or the current location of the elevator 120 may not be displayed in the first part 1210-1.

If the elevator 120 has been set as a dedicated elevator or if the robot 100 is not getting on the elevator 120, text "A robot is getting on" may not be displayed in the first part 1210-1.

Alternatively, text "A robot is getting on" or text "A robot is getting off" may be displayed only when the door of the elevator 120 is opened and the getting on of the robot 100 on the elevator 120 or the getting off of the robot 100 from the elevator 120 is performed.

The second parts 1220-1 to 1220-3 may indicate floor selections that user interfaces. The second parts 1220-1 to 1220-3 may be implemented as touch screens.

As illustrated in the second part 1220-2, information on a floor to which the elevator 120 may move and a button corresponding to a corresponding floor may be displayed in the second part 1220-2. Furthermore, the door open button and door close button of the elevator 120 may be displayed in the second part 1220-2.

As illustrated in the second part 1220-1, information indicative of the getting on/getting off of the robot 100 may be displayed in the second part 1220-1. For example, in the illustrated example, information indicating that one robot will get on the seventeenth floor and two robots will get on the twentieth floor may be displayed in the second part 1220-1. Alternatively, information indicating that one robot will get off on the seventeenth floor and two robots will get off on the twentieth floor may be displayed in the second part 1220-1. In other words, the internal user interface 1200 may be configured to display information on a floor where the robot 100 (or another robot) will get on/off the elevator 120 and/or information on the number of robots 100 that will get on/off the elevator 120. For example, a user who gets on the elevator 120 may check how many other robots will get on the elevator 120 on what floor through the internal user interface 1200, and may check how many robots that have gotten on the elevator 120 will get off on what floor.

As illustrated in the second part 1220-3, if the elevator 120 has been set as a dedicated elevator, only an indicator indicating that the elevator 120 has been set as a dedicated elevator may be displayed. The indicator may include an image having a robot shape and text, such as "This is a robot-dedicated elevator. Please use another elevator". In such an embodiment, a user who has gotten on the elevator 120 cannot select a floor to which the user will move.

The internal user interface 1200 may be configured to have its inter-floor move button deactivated so that a user who has gotten on the elevator 120 cannot set a floor to which the elevator 120 will move. The deactivation of the inter-floor move button may be performed if the elevator 120 has been set as a dedicated elevator or if the robot 100 has gotten on the elevator 120.

The internal user interface 1200 may be configured to have its door close button deactivated so that a user who has gotten on the elevator 120 cannot forcedly close the door of the elevator 120. The deactivation of the door close button may be performed only when the door of the elevator 120 is opened and the getting on of the robot 100 on the elevator 120 or the getting off of the robot 100 from the elevator 120 is performed.

The deactivation of the button is performed so that a user cannot select the button. The button may not be displayed in the internal user interface 1200, or the button is displayed in the internal user interface 1200 (or (e.g., blurredly) displayed so that the button is different from an activated button), but may not be pressed. The door close button deactivated in the illustrated second parts 1220-2 and 1220-3 is indicated as a dotted line.

The illustrated second part 1220-3 may correspond to a case where the elevator 120 has been set as a dedicated elevator. In such a case, both the inter-floor move button and the door close button of the internal user interface 1200 may be deactivated. The internal user interface 1200 may be configured to have the inter-floor move button activated if the elevator 120 has not been set as a dedicated elevator.

The illustrated second part 1220-2 may correspond to a case where the door of the elevator 120 is opened and the getting on of the robot 100 on the elevator 120 or the getting off of the robot 100 from the elevator 120 is performed. In this case, in order to prevent the forced closing of the door by a user, the door close button of the internal user interface 1200 may be deactivated. Furthermore, as illustrated, the door open button of the internal user interface 1200 may be forcedly activated. That is, the EV control system 130 may enable the door of the elevator 120 to be in a forced open state until the getting on or getting off process of the robot 100 is completed.

The description of the technical characteristics described with reference to FIGS. 1 to 11 may also be applied to FIG. 12 without any change, and thus a redundant description thereof is omitted.

FIGS. 13 to 17 are flowcharts illustrating operations of the robot control system 140, the robot 100, a user, an elevator 110 and the EV control system 130 from a summons on an elevator by the robot to the getting off of the robot from the elevator according to an example.

Figure 13:
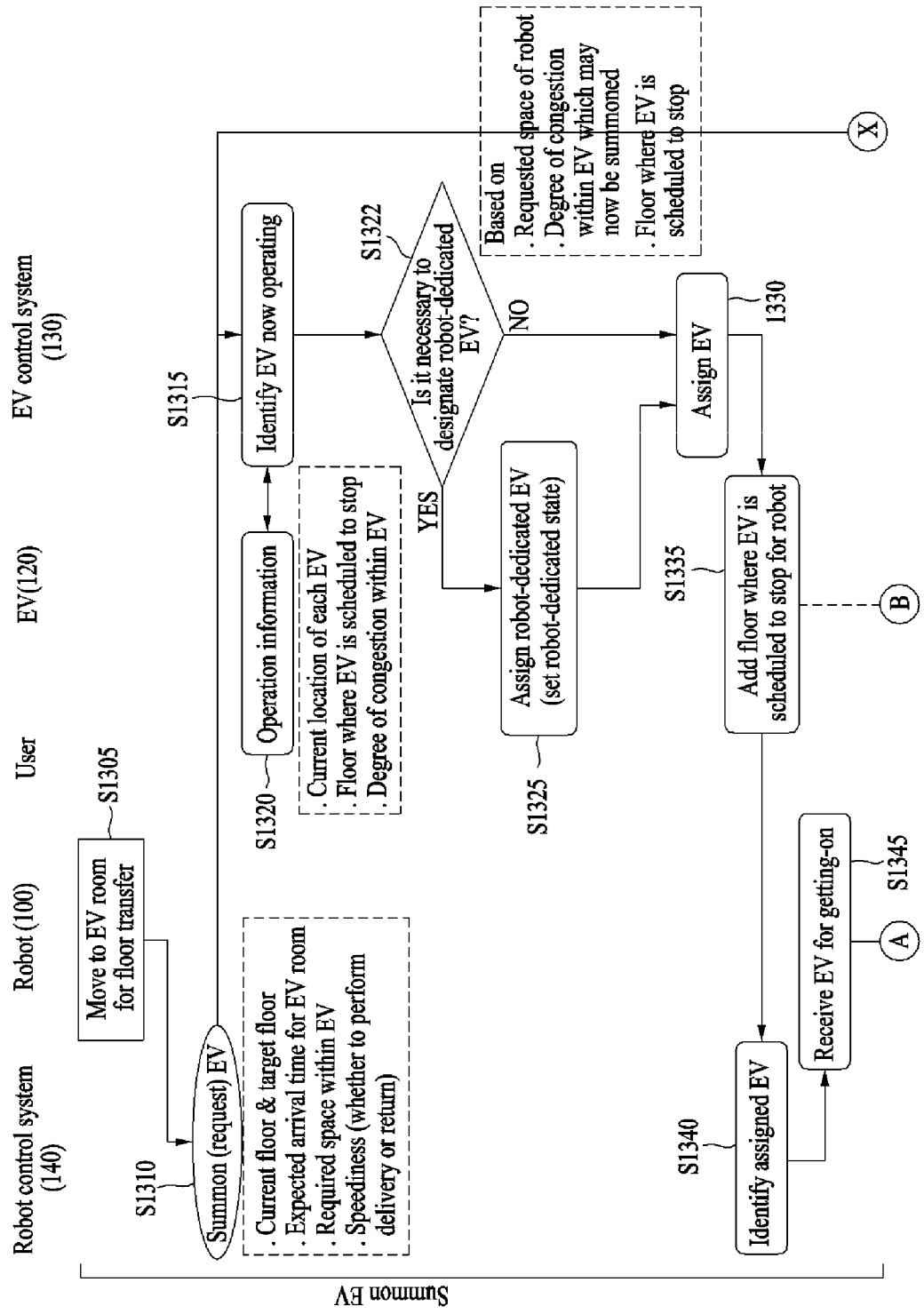
FIGS. 13 to 17 are flowcharts illustrating operations of the control system, the robot, a user, an elevator and an EV control system from a summons on an elevator by the robot to the getting off of the robot from the elevator according to an example embodiments.

An operation when an elevator is summoned is described below with reference to FIG. 13.

The robot 100 may move to an elevator room (or a waiting space where the robot gets on the elevator) for a movement between floors within a building (S1305). The robot control system 140 may request the EV control system 130 to summon an elevator (S1310). Such a summons may include information on the floor where the robot 100 is now located and the target floor (i.e., a floor where a service will be provided) of the robot 100, information on an expected time when the robot 100 will arrive at the elevator room, information on a required space within the elevator 120, and information on whether speediness is necessary (e.g., speediness is necessary if the robot performs delivery, but speediness is not necessary if the robot returns to its original location). The EV control system 130 may identify an elevator that now operates (S1315), and may communicate operation information with the elevator 120 (S1320). The operation information may include information on the current location of each of the elevators 110, a floor where each elevator is scheduled to stop, and a degree of congestion of each elevator. The EV control system 130 may determine whether a robot-dedicated elevator needs to be set (S1322). Such a determination may be performed based on at least one of the current time, a degree of congestion within an elevator that may be summoned, and a floor where the elevators 110 is scheduled to stop. If it is determined that a robot-dedicated elevator needs to be set, the EV control system 130 may set the elevator 120 as a robot-dedicated elevator (S1325), and may assign the elevator 120 as an elevator to be summoned (S1330). If it is determined that a robot-dedicated elevator does not need to be set, the EV control system 130 assigns an elevator to be immediately summoned. The floor where the assigned elevator 120 is scheduled to stop so that the robot 100 gets on may be added to the assigned elevator 120 (S1335). The robot control system 140 may identify the assigned elevator 120 (S1340), and may transmit such information to the robot 100 (S1345).

Figure 14:
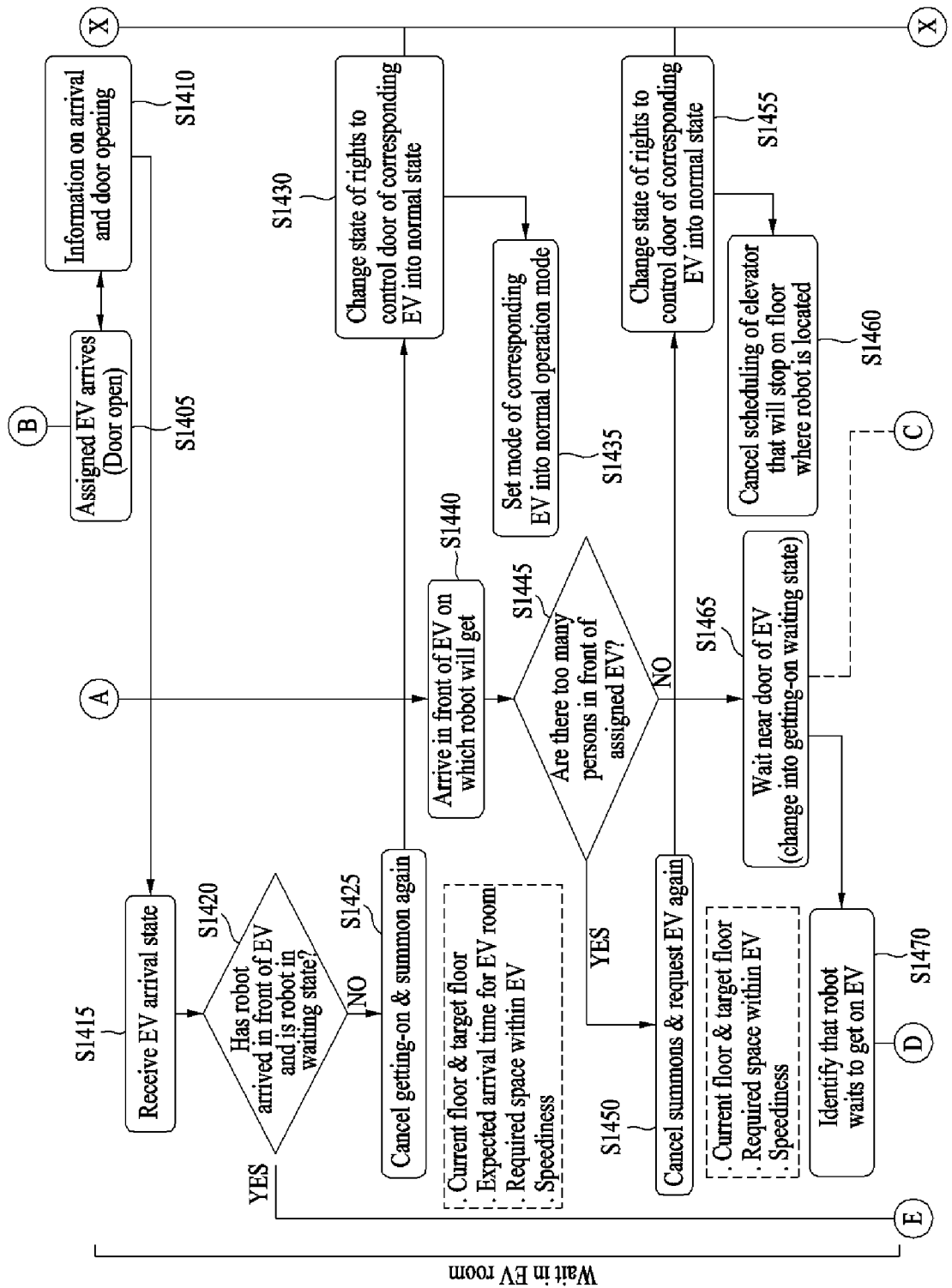

An operation when the robot 100 waits in an elevator room, i.e., a waiting area, is described below with reference to FIG. 14.

When the elevator 120 arrives at a location where the robot 100 will be summoned and the elevator door is opened (S1405), information on the arrival and door opening of the elevator 120 may be transmitted to the EV control system 130 (S1410). The robot control system 140 may receive the arrival state of the elevator 120 from the EV control system 130 (S1415). The robot control system 140 may identify whether the robot 100 has arrived in front of the elevator 120 and is waiting (S1420). If the robot 100 has arrived in front of the elevator 120 and is waiting, an operation after getting on the elevator may be performed. If the robot 100 does not arrive in front of the elevator 120 and does not wait, the robot control system 140 may cancel the operation for getting the robot 100 on the elevator and summon an elevator again (S1425). The re-summons may also include the same information as the original summons. The EV control system 130 may change the state of rights to control the door of the elevator 120 into a normal state (S1430) in which the door operates as in an elevator that is not robot-dedicated, and may change the operation mode of the elevator 120 into a normal operation mode (S1435) in which the elevator does not operate as a robot-dedicated elevator.

When the robot 100 arrives (or before the summoned elevator 120 arrives) in front of the summoned elevator 120 (S1440), the robot 100 may determine whether a waiting space for the elevator 120 is too congested (i.e., whether there are too many persons) (S1445). If the waiting space for the elevator 120 is too congested, the robot control system 140 may cancel the summons and may summon an elevator again (S1450). Accordingly, the EV control system 130 may cancel the assignment of the elevator 120 (S1455), and may also cancel the scheduling of the elevator 120 that will stop on the floor where the robot 100 is located (S1460). If the waiting space for the elevator 120 is not congested, the robot 100 may wait near the (outside) door of the elevator 120 (S1465). The robot control system 140 identifies the state of the robot 100 that waits for getting on the elevator 120 (S1470).

Figure 15:
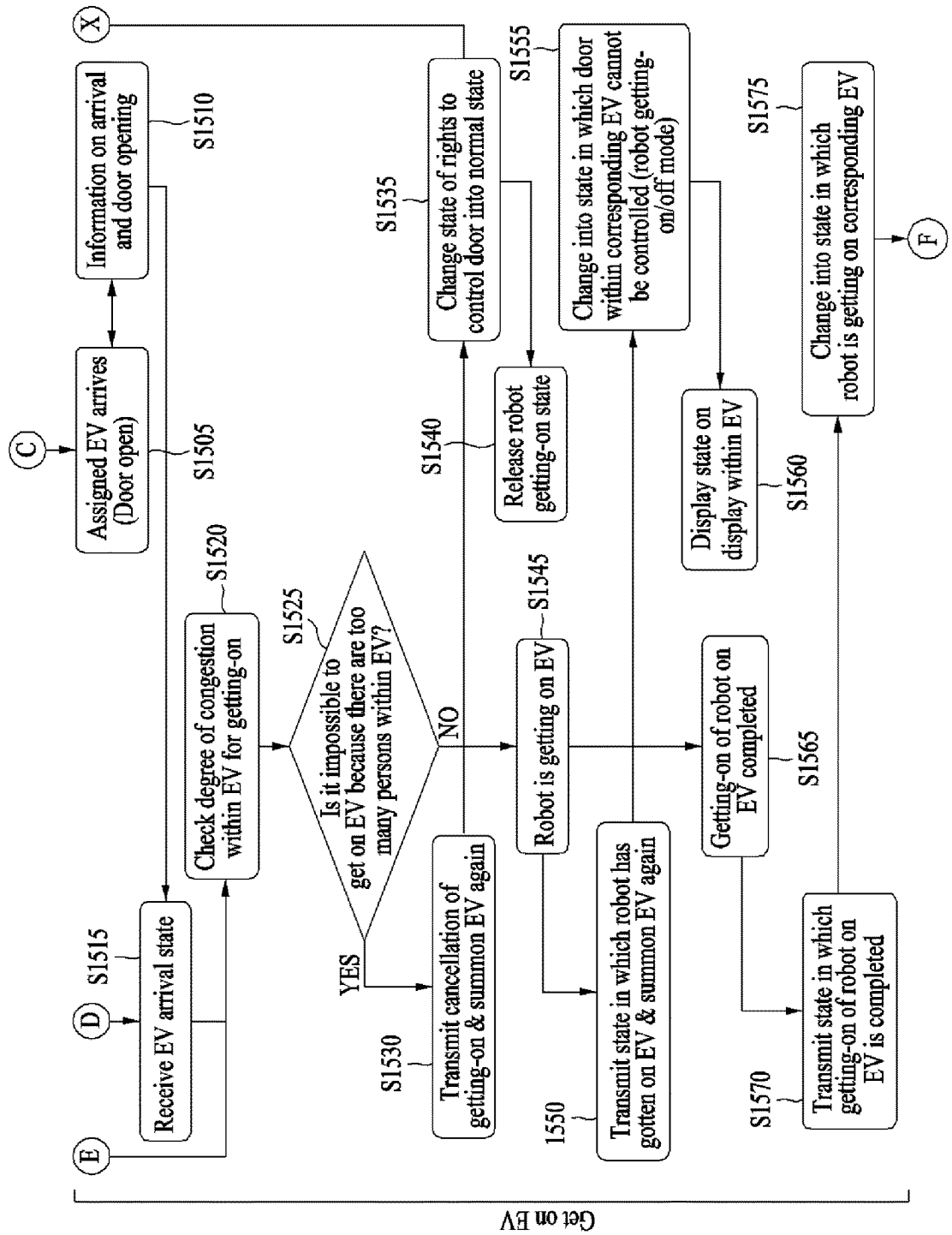
Figure 16:
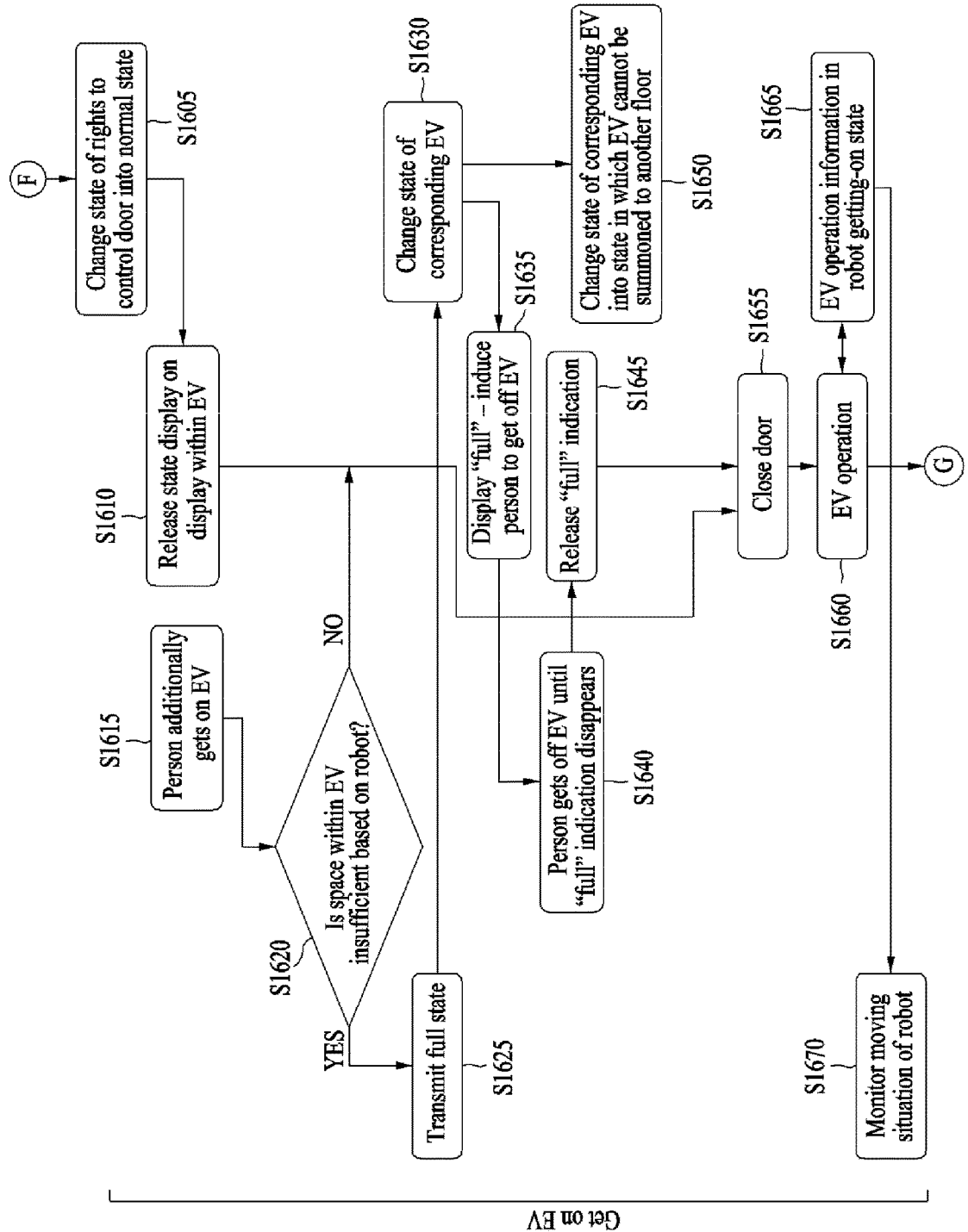

An operation when the robot 100 gets on the elevator 120 is described with reference to FIGS. 15 and 16.

When the elevator 120 arrives at the location where the elevator is summoned for the robot 100 and the door of the elevator is opened (S1505), information on the arrival and door opening of the elevator 120 may be communicated with the EV control system 130 (S1510). The robot control system 140 may receive the arrival state of the elevator 120 from the EV control system 130 (S1515). The robot 100 may identify a degree of congestion within the elevator 120 (S1520). The robot 100 may determine whether the robot cannot get on the elevator 120 because there are too many persons (and/or other robots) in the elevator 120 (S1525). If the robot 100 cannot get on the elevator 120 because the elevator 120 is too congested, the robot control system 140 may cancel a previous summons and summon an elevator again (S1530). The EV control system 130 may change the state of rights to control the door of the elevator 120 into a normal state (S1535), and may release the state in which the robot gets on the elevator 120 (S1540). If it is determined that the elevator 120 is not congested, the robot 100 gets on the elevator 120 (S1545). The robot control system 140 may transmit, to the EV control system 130, the state in which the robot has gotten on the elevator (S1550). That is, the robot control system 140 may request the opening of the door of the elevator 120 to be maintained. The EV control system 130 may make impossible control of the door of the elevator 120 (i.e., a robot getting-on/getting-off mode) (S1555). Accordingly, the door close button of the elevator 120 may be deactivated. A corresponding state may be displayed in the internal user interface (i.e., display) of the elevator 120 (S1560). When the getting on of the robot 110 is completed (S1565), the robot control system 140 may transmit a robot getting-on completion state to the EV control system 130 (S1570). The EV control system 130 may change the state of the elevator 120 into a robot getting-on state (S1575).

Next, the EV control system 130 may change the state of rights to control the door of the elevator 120 into the normal state (S1605), and may release the state display in the internal user interface (i.e., display) of the elevator 120 (S1610). Accordingly, the door close button of the elevator 120 may be activated again. When the door of the elevator 120 is closed (S1655) and the elevator 120 starts to move (S1660), operation information of the elevator 120 in the robot getting-on state may be communicated with the EV control system 130 (S1665). The robot control system 140 may monitor a movement situation of the robot 100. If a user has additionally gotten on the elevator 120 (S1615), the robot 100 may determine whether a space within the elevator 120 is insufficient (S1620). If it is determined that the space is not insufficient, the door of the elevator 120 is closed without any change (S1655). If it is determined that the space is insufficient, the full state of the elevator is transmitted to the robot control system 140, which transmits the full state to the EV control system 130 (S1625). The EV control system 130 may change the state of the elevator 120, and may display "full" in the internal user interface of the elevator 120 in order to induce the user to get off the elevator (S1635). If the user gets off the elevator until the "full" indication disappears (S1640), the "full" indication may be released in the internal user interface of the elevator 120 (S1645). In the case of the "full state," the state of the elevator 120 may be changed into the summons-impossible state in another floor (S1650).

Figure 17:
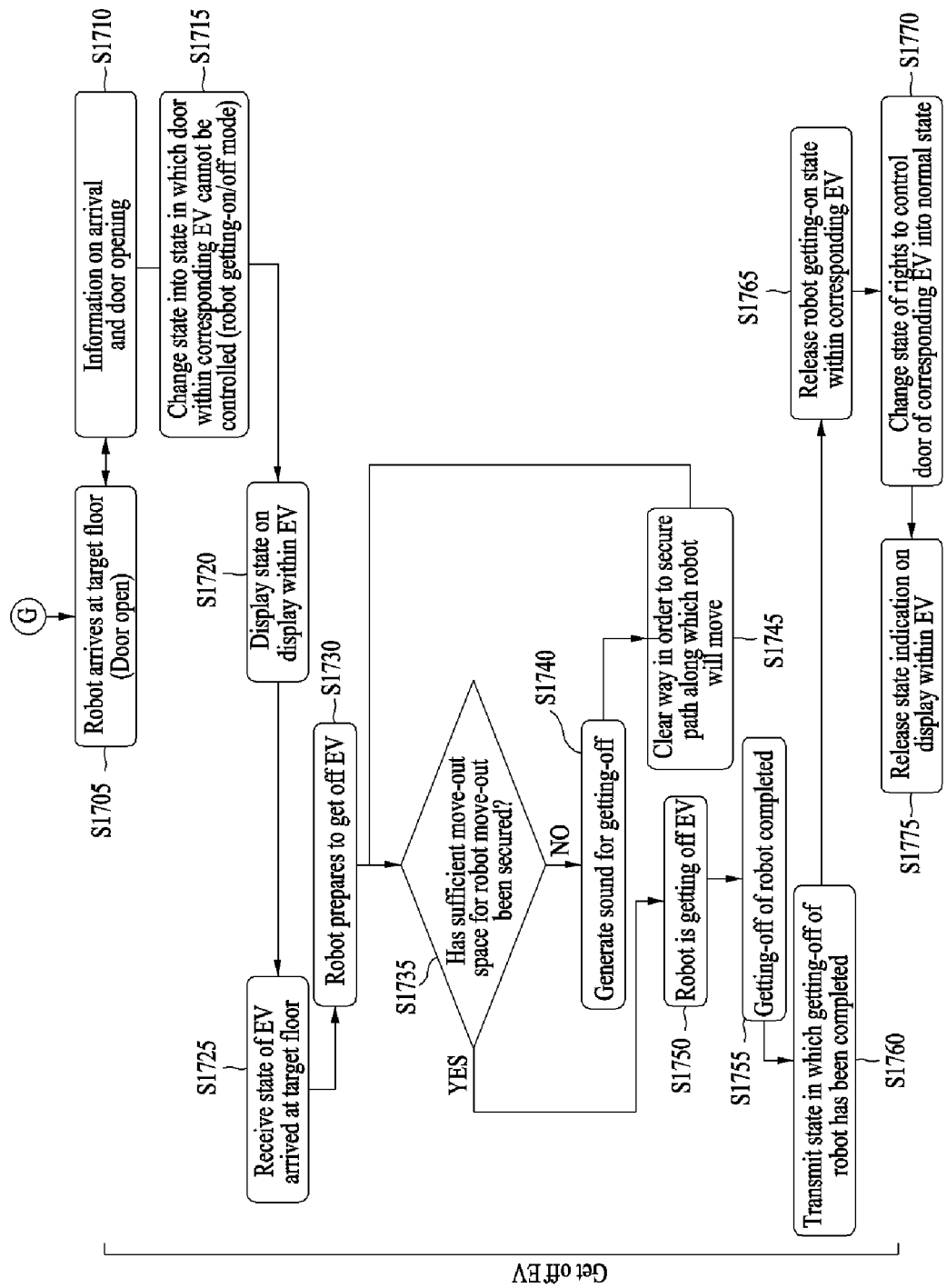

An operation when the robot 100 gets off the elevator 120 is described below with reference to FIG. 17.

When the elevator 120 arrives at a floor, that is, a target floor where the robot 100 will provide a service (S1705), the EV control system 130 may communicate the arrival and door open information with the elevator 120 (S1710). The EV control system 130 may change the door of the elevator 120 into a control-impossible state (i.e., a robot getting-on/getting-off mode) (S1715). A corresponding state may be displayed in the internal user interface (or display) of the elevator 120 (S1720). The robot control system 140 may receive, from the EV control system 130, the arrival state indicating that the elevator 120 has arrived at the target floor (S1725), and may instruct the robot 100 to prepare for getting off (S1730). The robot 100 may determine whether a sufficient move-out space for getting off has been secured in the elevator 120 (S1735). If it is determined that a sufficient space for getting off is secured in the elevator 120, the robot 100 may get off the elevator 120 (S1750), and the getting-off of the robot 100 may be completed (S1755). The robot getting-off completion state may be transmitted from the robot control system 140 to the EV control system 130. The EV control system 130 may release the robot getting-on state of the elevator 120 (S1765), and may change the state of rights to control the door of the elevator 120 into the normal state (S1770). The EV control system 130 may release the state display in the internal user interface (or display) of the elevator 120 (S1775). Accordingly, the door close button of the elevator 120 may be activated again. If it is determined that a sufficient move-out space for getting-off is not secured in the elevator 120, the robot 100 may generate a sound for getting off (S1740). Accordingly, if a user gets off the elevator 120 in order to secure the space for the getting-off of the robot 100 or clears the way for the robot 100 (S1745), the robot 100 may get off the elevator 120.

As described with reference to FIGS. 13 to 17, control of the elevator 120 from the summons on the elevator 120 by the robot 100 to the getting off of the robot 100 from the elevator 120 may be performed.

The aforementioned apparatus, device or units may be implemented as a hardware component, a software component and/or a combination of them. For example, the apparatus and elements described in the embodiments may be implemented using one or more general-purpose computers or special-purpose computers, for example, a processor, a controller, an arithmetic logic unit (ALU), a digital signal processor, a microcomputer, a field programmable gate array (FPGA), a programmable logic unit (PLU), a microprocessor or any other device capable of executing or responding to an instruction. A processing apparatus (or processor) may perform an operating system (OS) and one or more software applications executed on the OS. Furthermore, the processing apparatus may access, store, manipulate, process and generate data in response to the execution of software. For convenience of understanding, one processing apparatus has been illustrated as being used, but a person having ordinary skill in the art may understand that the processing apparatus may include a plurality of processing elements and/or a plurality of types of processing elements. For example, the processing apparatus may include a plurality of processors or a single processor and a single controller. Furthermore, other processing configurations, such as a parallel processor, are also possible.

Software may include a computer program, code, an instruction or a combination of one or more of them and may configure a processor so that it operates as desired or may instruct processors independently or collectively. The software and/or data may be embodied in any type of a machine, component, physical device, virtual equipment, or computer storage medium or device so as to be interpreted by the processor or to provide an instruction or data to the processor. The software may be distributed to computer systems connected over a network and may be stored or executed in a distributed manner. The software and data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure alone or in combination. The program instructions stored in the medium may be specially designed and constructed for the present disclosure, or may be known and available to those skilled in the field of computer software. Examples of the computer-readable storage medium include magnetic media such as a hard disk, a floppy disk and a magnetic tape, optical media such as a CD-ROM and a DVD, magneto-optical media such as a floptical disk, and hardware devices specially configured to store and execute program instructions such as a ROM, a RAM, and a flash memory. Examples of the program instructions include not only machine language code that is constructed by a compiler but also high-level language code that can be executed by a computer using an interpreter or the like.

A user who tries to use an elevator may check whether a robot has gotten on the elevator or the elevator has been set as a robot-dedicated elevator because at least one of the internal user interface and external user interface of the elevator is configured to indicate whether a robot is using the elevator. Accordingly, a user can refrain from using an elevator used by a robot or a robot-dedicated elevator through such a configuration of the internal user interface and/or the external user interface.

A user can refrain from using an elevator used by a robot or a robot-dedicated elevator because some functions in the internal user interface of the elevator used by the robot or the robot-dedicated elevator are restricted. Accordingly, interference between a robot and a user can be minimized in using the elevator.

A robot can efficiently use an elevator and effectively provide a service because a specific elevator is set as a dedicated elevator for the getting on of the robot for a given time period.

Furthermore, an elevator most appropriate for the robot can be summoned and thus the robot can provide an effective service because the elevator appropriate for the robot is summoned by considering the waiting space for the elevator and a degree of congestion within the elevator.

As described above, although the embodiments have been described in connection with the limited embodiments and drawings, those skilled in the art may modify and change the embodiments in various ways from the description. For example, proper results may be achieved although the above descriptions are performed in order different from that of the described method, and/or the aforementioned elements, such as the system, configuration, device, and circuit, are coupled or combined in a form different from that of the described method or replaced or substituted with other elements or equivalents. Accordingly, other implementations, other embodiments, and equivalents of the claims fall within the scope of the claims.

What is claimed is:

1. A method, performed by a computer system, of controlling at least one elevator for at least one robot passenger, comprising:
    receiving a summons from a robot control system controlling the robot;
    selecting an elevator to be summoned to a floor indicated by the summons;
    controlling the selected elevator to move to the floor indicated by the summons;
    receiving a cancellation of the summons on the selected elevator from the robot control system when the robot is unable to get on the selected elevator;
    selecting another elevator to be summoned to the floor indicated by the summons;
    controlling the another elevator to move to the floor indicated by the summons;
    detecting that at least one robot providing a service on at least one of floors within a building has gotten on the selected elevator or the another elevator;
    controlling the selected elevator or the another elevator carrying the at least one robot to move to a floor where the at least one robot is to provide the service,
    wherein at least one of an internal user interface and an external user interface of the elevator carrying the at least one robot is configured to indicate whether the at least one robot is using the elevator carrying the at least one robot.

2. The method of claim 1, wherein:
    a plurality of elevators is provided in the building, and
    the method further comprises setting the elevator, among the plurality of elevators, as a dedicated elevator for the robot for a given time period.

3. The method of claim 2, wherein at least one of the external user interface and the internal user interface of the elevator set as the dedicated elevator is configured to indicate that the elevator has been set as the dedicated elevator.

4. The method of claim 1, wherein the internal user interface is configured to indicate a floor where the at least one robot is to provide the service when the at least one robot gets on the elevator.

5. The method of claim 1, wherein the internal user interface is configured to indicate information on a floor where another robot is to get on the elevator.

6. The method of claim 1, wherein:
    a plurality of robots provides services within the building, and
    when the plurality of robots are detected on the selected elevator or another elevator, controlling the selected elevator or the another elevator carrying the plurality of robots to sequentially move to floors where the plurality of robots are to provide services, respectively.

7. The method of claim 1, wherein the elevator carrying the at least one robot is controlled to not move to a floor where a user summons the elevator carrying the at least one robot when the at least one robot has gotten on the elevator carrying the at least one robot.

8. The method of claim 1, wherein the external user interface is configured to indicate that the at least one robot is getting on the elevator carrying the at least one robot or that the elevator carrying the at least one robot is used as a dedicated elevator for the robot, but not to indicate whether the elevator carrying the at least one robot goes up or down, a current location of the elevator carrying the at least one robot, and a floor where the elevator carrying the at least one robot is scheduled to stop.

9. The method of claim 1, wherein the internal user interface is configured to have an inter-floor move button deactivated so that a user who has gotten on the elevator carrying the at least one robot is unable to set a floor to which the elevator carrying the at least one robot is to move.

10. The method of claim 1, wherein when a door of the elevator carrying the at least one robot is opened and the getting on of the at least one robot on the elevator carrying the at least one robot or a getting off of the at least one robot from the elevator carrying the at least one robot is performed, the internal user interface is configured to have a door close button deactivated so that a user who has gotten on the elevator carrying the at least one robot is unable to forcedly close the door of the elevator carrying the at least one robot.

11. The method of claim 1, further comprising setting a state of the elevator to be summoned as a full state when it is determined that a space sufficient for the at least one robot to get on the elevator to be summoned is not present,
wherein the state of the elevator to be summoned set in the full state is set as a summons-impossible state.

12. The method of claim 11, wherein:
the internal user interface of the elevator to be summoned is configured to output an indicator indicative of the full state,
the indicator is output, until a user or the at least one robot in the elevator to be summoned gets off the elevator to be summoned and the sufficient space is secured, and
the state of the elevator to be summoned is set as a summons-possible state when the sufficient space is secured.

13. A non-transitory computer-readable recording medium storing a program to perform the method according to claim 1.

14. A method, performed by a computer system, of controlling at least one elevator for at least one robot passenger, comprising:
receiving a summons from a robot control system controlling the robot;
selecting an elevator to be summoned to a floor indicated by the summons;
controlling the selected elevator to move to the floor indicated by the summons;
receiving a cancellation of the summons on the selected elevator from the robot control system when a given number or more of users or robots are present in a waiting space for getting on the selected elevator;
selecting another elevator to be summoned to the floor indicated by the summons;
controlling the another elevator to move to the floor indicated by the summons;
detecting that at least one robot providing a service on at least one of floors within a building has gotten on the selected elevator or the another elevator; and
controlling the selected elevator or the another elevator carrying the at least one robot to move to a floor where the at least one robot is to provide the service,
wherein at least one of an internal user interface and an external user interface of the elevator carrying the at least one robot is configured to indicate whether the at least one robot is using the elevator carrying the at least one robot.

15. A method, performed by a computer system, of controlling at least one elevator for at least one robot passenger, comprising:
receiving a summons from a robot control system controlling a plurality of robots providing services within a building;
selecting an elevator to be summoned to at least one floor indicated by the summons;
controlling the selected elevator to move to the at least one floor indicated by the summons;
detecting that the plurality of robots providing services on the at least one floor within the building has gotten on the selected elevator; and
controlling the selected elevator carrying the plurality of robots to move to the at least one floor where the plurality of robots is to provide the services,
wherein at least one of an internal user interface and an external user interface of the elevator carrying the plurality of robots is configured to indicate whether the at least one robot passenger is using the elevator, and
the controlling of the selected elevator comprises controlling the selected elevator so that a robot to get off the selected elevator later, among the plurality of robots, gets on the selected elevator first.

16. A system for controlling an elevator for at least one robot passenger, comprising:
at least one processor implemented to execute a computer-readable instruction, wherein the at least one processor controls the system to:
receive a summons from a robot control system controlling the robot;
select an elevator to be summoned to a floor indicated by the summons;
control the selected elevator to move to the floor indicated by the summons;
receive a cancellation of the summons on the selected elevator from the robot control system when the robot is unable to get on the selected elevator;
select another elevator to be summoned to the floor indicated by the summons;
control the another elevator to move to the floor indicated by the summons;
detect that at least one robot providing a service on at least one of floors within a building has gotten on the selected elevator or the another elevator moving through the floors, and
control the selected elevator or the another elevator carrying the at least one robot to move to a floor where the at least one robot is to provide the service,
wherein at least one of an internal user interface and an external user interface of the elevator carrying the at least one robot is configured to indicate whether the at least one robot is using the elevator carving the at least one robot.

17. A robot control method performed by a robot control system controlling a robot which moves through floors of a building using an elevator and provides a service, the robot control method comprising:
transmitting, to an elevator control system controlling at least one elevator, a summons comprising information on a floor where the robot is located and a floor where the robot is to provide a service;
controlling the robot to get on an elevator moved to the floor where the robot is located by the elevator control system in response to the summons;
transmitting a cancellation of the summons to the elevator control system and transmitting another summons for requesting another elevator when the robot is unable to get on the elevator;
when the elevator or the another elevator carrying the robot automatically moves to the floor where the robot is to provide the service, controlling the robot to get off the elevator or the another elevator; and
controlling the robot to provide the service on the floor where the robot is to provide the service.

18. The robot control method of claim 17, further comprising transmitting the cancellation of the summons and the transmitting of the summons for requesting another elevator, when a given number or more of users or robots are present in a waiting space for the elevator moved to the floor where the robot is located in response to the summons.

* * * * *